United States Patent
Zhou et al.

(10) Patent No.: US 12,015,938 B2
(45) Date of Patent: Jun. 18, 2024

(54) TECHNIQUES FOR AUTONOMOUS BEAM FAILURE INDICATOR COUNTING

(71) Applicant: QUALCOMM Incorporated, San Diego, CA (US)

(72) Inventors: Shanyu Zhou, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/485,002

(22) Filed: Sep. 24, 2021

(65) Prior Publication Data

US 2023/0102187 A1    Mar. 30, 2023

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC ..... H04W 24/04; H04W 24/08; H04W 24/10; H04W 72/046; H04W 74/004; H04W 74/0833; H04W 72/21; H04W 76/18; H04W 76/14; H04W 76/15; H04B 7/06964; H04B 7/022; H04B 7/0695

See application file for complete search history.

(56) References Cited

U.S. PATENT DOCUMENTS

| | | | | |
|---|---|---|---|---|
| 11,316,798 B2* | 4/2022 | Zhang | | H04W 24/10 |
| 11,626,918 B2* | 4/2023 | Chin | | H04B 7/0695 |
| | | | | 370/329 |
| 11,706,647 B2* | 7/2023 | Wei | | H04B 7/0695 |
| | | | | 370/241 |
| 11,751,183 B2* | 9/2023 | Hakola | | H04B 7/088 |
| | | | | 370/329 |
| 11,917,436 B2* | 2/2024 | Wei | | H04B 7/0695 |
| 2019/0268790 A1* | 8/2019 | Kwon | | H04B 7/0632 |
| 2021/0028848 A1* | 1/2021 | Tsai | | H04W 72/23 |
| 2023/0276530 A1* | 8/2023 | Jeon | | H04W 36/06 |
| | | | | 370/329 |
| 2023/0328771 A1* | 10/2023 | Zhang | | H04W 72/542 |
| | | | | 370/225 |
| 2023/0345492 A1* | 10/2023 | Kang | | H04L 5/0094 |
| 2024/0039612 A1* | 2/2024 | Jung | | H04L 5/0048 |

* cited by examiner

*Primary Examiner* — Brian T O Connor
(74) *Attorney, Agent, or Firm* — Holland & Hart LLP

(57) ABSTRACT

Methods, systems, and devices for wireless communications are described. In some systems, a user equipment (UE) may receive a periodic reference signal from a base station and may measure the periodic reference signal as part of a beam failure detection (BFD) procedure. To detect a beam failure, the UE may autonomously select a beam failure indicator (BFI) counting scheme from a set of BFI counting schemes and may increment a BFI count in accordance with the selected BFI counting scheme and based on measuring the reference signal. The different BFI counting schemes of the set of BFI counting schemes may feature different techniques or methods for incrementing the BFI count per one or more BFI reports. As such, the UE may selectively choose how to weight different sets of one or more BFI reports in terms of contribution to the BFI count, which may improve BFD detection at the UE.

30 Claims, 15 Drawing Sheets

TECHNIQUES FOR AUTONOMOUS BEAM FAILURE INDICATOR COUNTING

FIELD OF TECHNOLOGY

The following relates to wireless communications, including techniques for autonomous beam failure indicator (BFI) counting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may communicate with a base station using directional communication. For example, the base station may transmit signaling to the UE using a first directional beam. To maintain a reliable communication link between the UE and the base station, the base station may periodically transmit a reference signal to the UE using the first directional beam and the UE may measure an error rate associated with the reference signal. As such, if the UE measures that the first directional beam is deteriorating (e.g., has a relatively high error rate or a consistently high error rate), the UE may declare beam failure and the UE and the base station may attempt to communicate with each other using a different directional beam.

SUMMARY

The described techniques relate to improved methods, systems, devices, and apparatuses that support techniques for autonomous beam failure indicator (BFI) counting. Generally, the described techniques provide for autonomous selection, at a user equipment (UE), of a BFI counting scheme from a set of available BFI counting schemes and for use of the selected BFI counting scheme as part of a beam failure detection (BFD) procedure. In some implementations, the UE may receive an indication of the set of available BFI counting schemes from which the UE may select. Additionally or alternatively, the set of available BFI counting schemes from which the UE may select may be pre-configured at the UE. In some implementations, the UE may transmit an indication of a capability of the UE for autonomous selection at the UE and may receive signaling from the base station activating autonomous selection at the UE based on transmitting the indication of the capability of the UE. Additionally or alternatively, the UE may receive signaling from the base station adjusting an autonomy level of the UE (e.g., signaling changing the set of available BFI counting schemes from which the UE may select) or deactivating the autonomous selection at the UE and the UE may adjust (or eliminate) the selection of a BFI counting scheme in accordance with the signaling.

A method for wireless communication at a UE is described. The method may include selecting, at the UE, a BFI counting scheme from a set of BFI counting schemes, measuring a reference signal transmitted by a base station during a set of multiple measurement occasions associated with BFD, incrementing a BFI count according to the BFI counting scheme and based on measuring the reference signal, and selectively transmitting, to the base station, an indication of a BFD based on the BFI count.

An apparatus for wireless communication at a UE is described. The apparatus may include a processor, memory coupled with the processor, and instructions stored in the memory. The instructions may be executable by the processor to cause the apparatus to select, at the UE, a BFI counting scheme from a set of BFI counting schemes, measure a reference signal transmitted by a base station during a set of multiple measurement occasions associated with BFD, increment a BFI count according to the BFI counting scheme and based on measuring the reference signal, and selectively transmit, to the base station, an indication of a BFD based on the BFI count.

Another apparatus for wireless communication at a UE is described. The apparatus may include means for selecting, at the UE, a BFI counting scheme from a set of BFI counting schemes, means for measuring a reference signal transmitted by a base station during a set of multiple measurement occasions associated with BFD, means for incrementing a BFI count according to the BFI counting scheme and based on measuring the reference signal, and means for selectively transmitting, to the base station, an indication of a BFD based on the BFI count.

A non-transitory computer-readable medium storing code for wireless communication at a UE is described. The code may include instructions executable by a processor to select, at the UE, a BFI counting scheme from a set of BFI counting schemes, measure a reference signal transmitted by a base station during a set of multiple measurement occasions associated with BFD, increment a BFI count according to the BFI counting scheme and based on measuring the reference signal, and selectively transmit, to the base station, an indication of a BFD based on the BFI count.

Some examples of the method, apparatuses, and non-transitory computer-readable medium described herein may further include operations, features, means, or instructions for transmitting, to the base station, an indication of a capability of the UE associated with autonomous selection of the BFI counting scheme from the set of BFI counting schemes at the UE, where selecting the BFI counting scheme from the set of BFI counting schemes may be based on the capability of the UE associated with the autonomous selection of the BFI counting scheme at the UE.

Some examples of the method, apparatuses, and non-transitory computer-readable medium described herein may further include operations, features, means, or instructions for receiving, from the base station, a control signal activating autonomous selection of the BFI counting scheme from the set of BFI counting schemes at the UE, where selecting the BFI counting scheme from the set of BFI counting schemes may be based on receiving the control signal activating the autonomous selection of the BFI counting scheme at the UE.

Some examples of the method, apparatuses, and non-transitory computer-readable medium described herein may further include operations, features, means, or instructions for receiving, from the base station, a control signal deactivating autonomous selection of the BFI counting scheme from the set of BFI counting schemes at the UE and receiving, from the base station, a configuration associated with a single BFI counting scheme.

Some examples of the method, apparatuses, and non-transitory computer-readable medium described herein may further include operations, features, means, or instructions for receiving, from the base station, a control signal indicating an autonomy level of the UE, where the autonomy level may be associated with one or more of a quantity of the set of BFI counting schemes or available schemes within the set of BFI counting schemes, and where selecting the BFI counting scheme from the set of BFI counting schemes may be based on the autonomy level of the UE.

Some examples of the method, apparatuses, and non-transitory computer-readable medium described herein may further include operations, features, means, or instructions for transmitting, to the base station, a request for activation or deactivation of autonomous selection of the BFI counting scheme from the set of BFI counting schemes at the UE and receiving, from the base station, a control signaling activating or deactivating the autonomous selection of the BFI counting scheme at the UE in accordance with the request for the activation or the deactivation of the autonomous selection of the BFI counting scheme at the UE.

Some examples of the method, apparatuses, and non-transitory computer-readable medium described herein may further include operations, features, means, or instructions for receiving, from the base station, an indication of the set of BFI counting schemes, where selecting the BFI counting scheme from the set of BFI counting schemes may be based on receiving the indication of the set of BFI counting schemes.

In some examples of the method, apparatuses, and non-transitory computer-readable medium described herein, the set of BFI counting schemes may be pre-configured at the UE.

Some examples of the method, apparatuses, and non-transitory computer-readable medium described herein may further include operations, features, means, or instructions for indicating, from a lower layer of the UE to an upper layer of the UE and based on the measuring, a BFI report for each measurement occasion of the set of multiple measurement occasions associated with BFD during which the UE measures that an error rate associated with the reference signal may be greater than a threshold error rate.

In some examples of the method, apparatuses, and non-transitory computer-readable medium described herein, incrementing the BFI count according to the BFI counting scheme and based on measuring the reference signal may include operations, features, means, or instructions for incrementing the BFI count by a first number for each second number of consecutive BFI reports, where the first number may be less than the second number.

In some examples of the method, apparatuses, and non-transitory computer-readable medium described herein, incrementing the BFI count according to the BFI counting scheme and based on measuring the reference signal may include operations, features, means, or instructions for incrementing the BFI count by a first number for each second number of consecutive BFI reports of a set of consecutive BFI reports if the set of consecutive BFI reports includes less than a threshold quantity of consecutive BFI reports and incrementing the BFI count by a third number for each fourth number of consecutive BFI reports of the set of consecutive BFI reports if the set of consecutive BFI reports includes greater than the threshold quantity of consecutive BFI reports.

In some examples of the method, apparatuses, and non-transitory computer-readable medium described herein, incrementing the BFI count according to the BFI counting scheme and based on measuring the reference signal may include operations, features, means, or instructions for incrementing a second BFI count by one for each of a total number of BFI reports.

In some examples of the method, apparatuses, and non-transitory computer-readable medium described herein, incrementing the BFI count according to the BFI counting scheme and based on measuring the reference signal may include operations, features, means, or instructions for determining the BFI count in accordance with an output of a machine learning algorithm based on a number of BFI reports and one or more channel measurements.

Some examples of the method, apparatuses, and non-transitory computer-readable medium described herein may further include operations, features, means, or instructions for receiving, from the base station, feedback associated with the determining of the BFI count in accordance with the output of the machine learning algorithm and adjusting one or more parameters associated with the machine learning algorithm based on the feedback.

In some examples of the method, apparatuses, and non-transitory computer-readable medium described herein, selectively transmitting the indication of the BFD may include operations, features, means, or instructions for transmitting the indication of the BFD if the BFI count exceeds a threshold count prior to expiration of a timer.

In some examples of the method, apparatuses, and non-transitory computer-readable medium described herein, selectively transmitting the indication of the BFD may include operations, features, means, or instructions for refraining from transmitting the indication of the BFD if the BFI count may be less than a threshold count at expiration of a timer.

In some examples of the method, apparatuses, and non-transitory computer-readable medium described herein, the reference signal includes a periodic reference signal and the set of multiple measurement occasions associated with BFD may be based on a periodicity associated with the periodic reference signal.

A method for wireless communication at a base station is described. The method may include receiving, from a UE, an indication of a capability of the UE associated with autonomous selection, at the UE, of a BFI counting scheme from a set of BFI counting schemes and transmitting, to the UE, a first control signal activating the autonomous selection of the BFI counting scheme from the set of BFI counting schemes at the UE based on the capability of the UE.

An apparatus for wireless communication at a base station is described. The apparatus may include a processor, memory coupled with the processor, and instructions stored in the memory. The instructions may be executable by the processor to cause the apparatus to receive, from a UE, an indication of a capability of the UE associated with autonomous selection, at the UE, of a BFI counting scheme from a set of BFI counting schemes and transmit, to the UE, a first control signal activating the autonomous selection of the BFI counting scheme from the set of BFI counting schemes at the UE based on the capability of the UE.

Another apparatus for wireless communication at a base station is described. The apparatus may include means for receiving, from a UE, an indication of a capability of the UE associated with autonomous selection, at the UE, of a BFI counting scheme from a set of BFI counting schemes and means for transmitting, to the UE, a first control signal activating the autonomous selection of the BFI counting scheme from the set of BFI counting schemes at the UE based on the capability of the UE.

A non-transitory computer-readable medium storing code for wireless communication at a base station is described. The code may include instructions executable by a processor to receive, from a UE, an indication of a capability of the UE associated with autonomous selection, at the UE, of a BFI counting scheme from a set of BFI counting schemes and transmit, to the UE, a first control signal activating the autonomous selection of the BFI counting scheme from the set of BFI counting schemes at the UE based on the capability of the UE.

Some examples of the method, apparatuses, and non-transitory computer-readable medium described herein may further include operations, features, means, or instructions for transmitting, to the UE, a second control signal indicating an autonomy level of the UE for the autonomous selection of the BFI counting scheme at the UE, where the autonomy level may be associated with one or more of a quantity of the set of BFI counting schemes or available schemes within the set of BFI counting schemes.

Some examples of the method, apparatuses, and non-transitory computer-readable medium described herein may further include operations, features, means, or instructions for receiving, from the UE, a request for activation of the autonomous selection of the BFI counting scheme at the UE, where transmitting the first control signal activating the autonomous selection of the BFI counting scheme at the UE may be based on receiving the request.

Some examples of the method, apparatuses, and non-transitory computer-readable medium described herein may further include operations, features, means, or instructions for transmitting, to the UE, a second control signal deactivating the autonomous selection of the BFI counting scheme at the UE and transmitting, to the UE, a configuration associated with a single BFI counting scheme.

Some examples of the method, apparatuses, and non-transitory computer-readable medium described herein may further include operations, features, means, or instructions for receiving, from the UE, a request for deactivation of the autonomous selection of the BFI counting scheme at the UE, where transmitting the second control signal deactivating the autonomous selection of the BFI counting scheme at the UE may be based on receiving the request.

Some examples of the method, apparatuses, and non-transitory computer-readable medium described herein may further include operations, features, means, or instructions for transmitting, to the UE, an indication of the set of BFI counting schemes, where transmitting the first control signal activating the autonomous selection of the BFI counting scheme from the set of BFI counting schemes at the UE may be based on transmitting the indication of the set of BFI counting schemes.

Some examples of the method, apparatuses, and non-transitory computer-readable medium described herein may further include operations, features, means, or instructions for receiving, from the UE, an indication of a BFD based on activating the autonomous selection of the BFI counting scheme at the UE.

DETAILED DESCRIPTION

Figure 1:
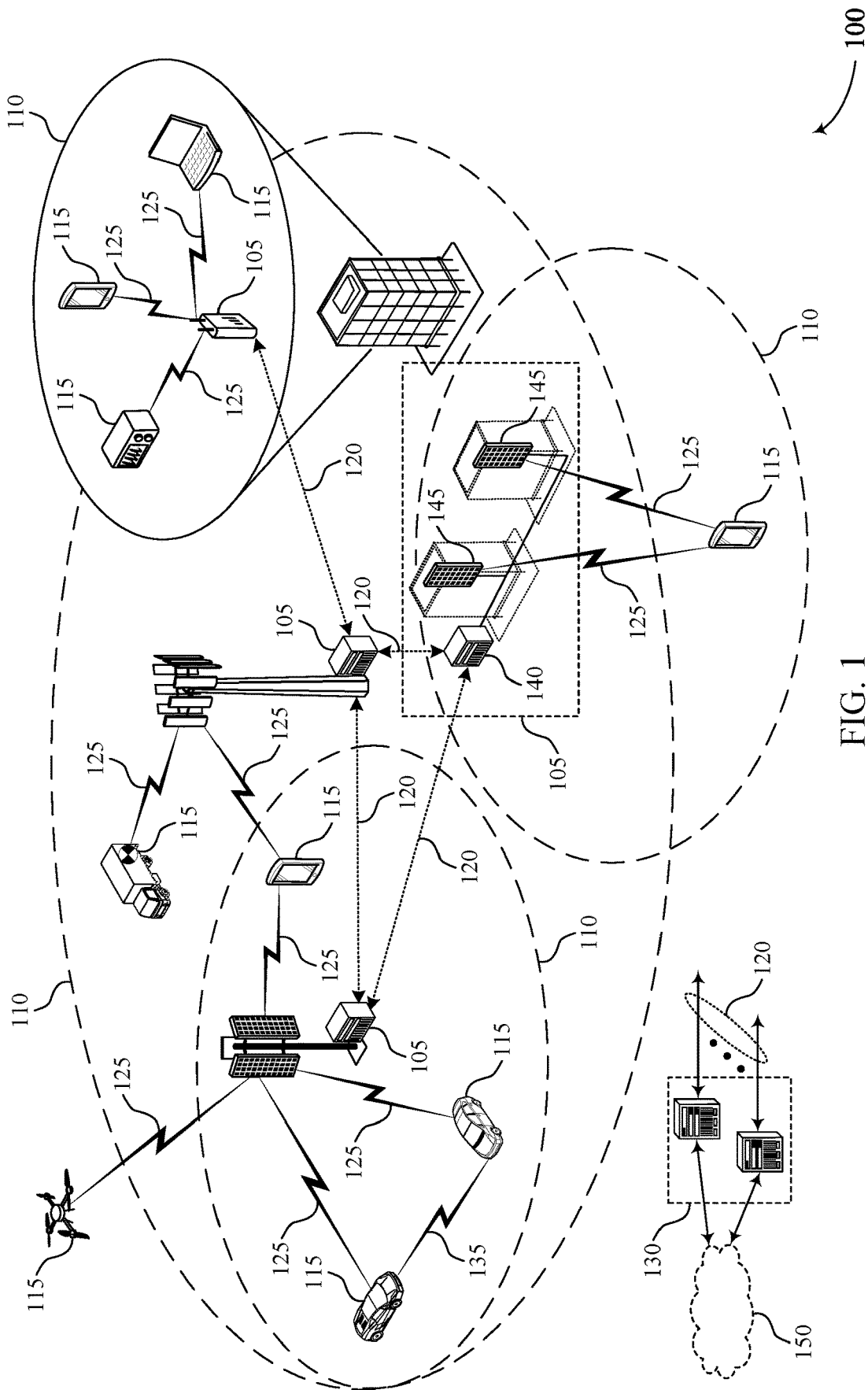
FIGS. 1 and 2 illustrate examples of wireless communications systems that support techniques for autonomous beam failure indicator (BFI) counting in accordance with aspects of the present disclosure.

In some wireless communications systems, a user equipment (UE) and a base station may communicate with each other using directional communication beams. For example, one or both of the UE or the base station may support configurations for directional communication according to which the UE or the base station may direct or focus signaling in one of various directions, and such directional communication may be referred to herein as communicating using a directional beam or beamforming communication. For example, the base station may transmit signaling to the UE using a first directional beam that focuses the signaling to the UE. To maintain link reliability for directional communication, the base station may periodically transmit a reference signal to the UE using the first directional beam and the UE may measure an error rate associated with the reference signal. In some cases, and if the measured error rate exceeds a threshold error rate, the UE may generate a beam failure indicator (BFI) report and may increment a BFI count for each BFI report. If the BFI count exceeds a threshold BFI count prior to an expiration of a beam failure detection (BFD) timer, the UE may transmit an indication of BFD to the base station. Such a reporting of BFI and an incrementing of the BFI count for each measurement occasion in which the error rate exceeds the threshold error rate, however, may lack flexibility for adjustments at the UE and may introduce latency in BFD. For example, the criteria for incrementing the BFI count may be configured by the base station and the UE may lack any mechanism for adjusting the BFI counting scheme, even if an adjustment may improve BFD accuracy at the UE.

In some implementations of the present disclosure, the UE may autonomously select a BFI counting scheme (e.g., a manner in which the UE increments the BFI count in view of one or more BFI reports or one or more channel measurements) from a set of available BFI counting schemes. The UE may receive an indication of the set of available BFI counting schemes from the base station (e.g., via configuration signaling or via signaling adjusting an autonomy level of the UE) or the set of available BFI counting schemes may be pre-configured at the UE, or a combination thereof. In some examples, the UE may select a BFI counting scheme according to which the UE increments the BFI count by a first number for each second number of consecutive BFI reports (e.g., consecutive measurement occasions in which a measured error rate exceeds a threshold error rate). In some other examples, the UE may select a BFI counting scheme according to which the UE increments the BFI count by the first number for each second number of consecutive BFI reports if a set of consecutive BFI reports includes less than a threshold quantity of BFI reports (e.g., if the quantity of consecutive BFI reports is relatively small) and increments the BFI count by a third number for each fourth number of consecutive BFI reports if the set of consecutive BFI reports includes greater than the threshold quantity of BFI reports (e.g., if the quantity of consecutive BFI reports is relatively large).

In some other examples, the UE may select a BFI counting scheme according to which the UE may maintain two separate BFI counts including a first BFI count that increases by a variable number for each number of consecutive BFI reports and a second BFI count that increases by one for each BFI report. In some other examples, the UE may select a BFI counting scheme according to which the UE determines the BFI count based on an output of a machine learning algorithm that takes BFI reports and channel measurements as inputs. In addition to enabling autonomous selection of a BFI counting scheme from a set of available BFI counting schemes at the UE, the UE and the base station may support signaling mechanisms according to which the UE may signal a capability for autonomous selection to the baes station and according to which the UE may request activation or deactivation of autonomous selection of a BFI counting scheme.

Particular aspects of the subject matter described herein may be implemented to realize one or more of the following potential advantages. For example, as a result of employing autonomous selection of a BFI counting scheme from a set of available BFI counting schemes at the UE, the UE may leverage relatively more sophisticated BFI counting schemes, such as machine learning-based BFI counting schemes, to improve BFD accuracy and improve BFD reaction time while reducing UE processing delay timelines. For example, the UE may avoid waiting for instructions to perform a BFD procedure from the base station, which may potentially lead to faster reaction to beam failure events. Further, autonomous selection of a BFI counting scheme at the UE may relax (e.g., reduce) usage of communication resources at the base station as the base station may use relatively fewer resources to control the UE. As a result of such relaxed usage of communication resources, the UE and the base station may support greater system capacity, increased throughput, and higher data rates, among other benefits.

Aspects of the disclosure are initially described in the context of wireless communications systems. Additionally, aspects of the disclosure are illustrated by and described with reference to a process flow. Aspects of the disclosure are further illustrated by and described with reference to apparatus diagrams, system diagrams, and flowcharts that relate to techniques for autonomous BFI counting.

FIG. 1 illustrates an example of a wireless communications system 100 that supports techniques for autonomous BFI counting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, the UE 115 may communicate with a base station 105 using one or more directional communication beams. For example, the base station 105 may transmit signaling to the UE 115 via a first beam that provides an area of constructive interference for the signaling at an approximate location of the UE 115. In some examples, the UE 115 and the base station 105 may support a BFD procedure to maintain a reliability of a communication link 125 between the UE 115 and the base station 105. For example, as part of the BFD procedure, the base station 105 may transmit a reference signal to the UE 115 using the first beam and the UE 115 may measure the reference signal to determine one or more of a receive power, a signal quality, or an error rate associated with the reference signal. If the UE 115 measures a receive power, a signal quality, or an error rate associated with the reference signal that fails to satisfy a threshold, the UE 115 may generate a BFI report at a physical (PHY) layer of the UE 115 and may send the BFI report to a MAC layer of the UE 115. As used herein, satisfying a threshold may mean that the metric exceeds the threshold, or meets or exceeds the threshold.

The UE 115 may increment a BFI count in correlation with the generation of BFI reports and, in some implementations, may autonomously select a BFI counting scheme from a set of available BFI counting schemes and increment the BFI count in accordance with the selected BFI counting scheme. In some implementations, the UE 115 may receive an indication of the set of available BFI counting schemes from the base station 105. Additionally or alternatively, the UE 115 may be pre-configured or equipped with the set of available BFI counting schemes. As such, the UE 115 may increment the BFI count in accordance with the selected BFI counting scheme and, if the BFI count exceeds a threshold count prior to expiration of a timer (e.g., a BFD timer), the UE 115 may transmit an indication of a BFD to the base station 105. In such scenarios in which the UE 115 transmits the indication of the BFD to the base station 105, the UE 115 and the base station 105 may select a different directional beam for communication with each other. Further, although referred to sometimes as BFI counting schemes, the described manners according to which the UE 115 may increment a BFI count may be equivalently referred to herein as BFI counting methods, BFI counting techniques, or BFI counting procedures.

Figure 2:
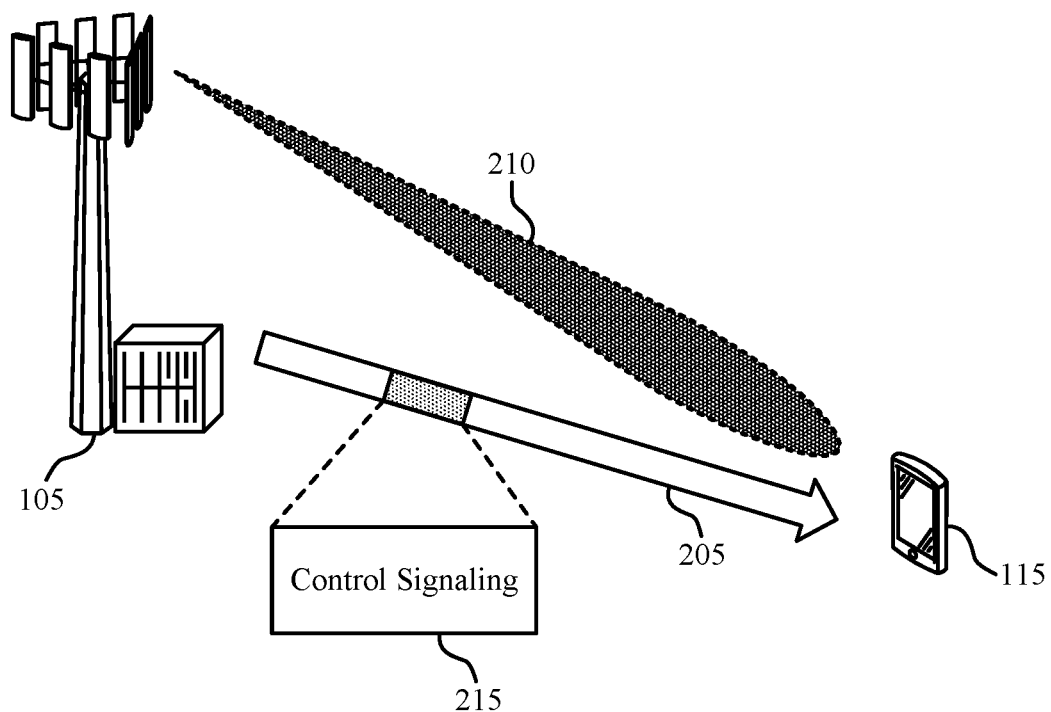
Figure 2:
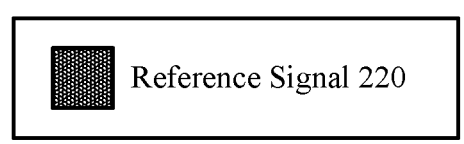

FIG. 2 illustrates an example of a wireless communications system 200 that supports techniques for autonomous BFI counting in accordance with aspects of the present disclosure. The wireless communications system 200 may implement or be implemented to realize aspects of the wireless communications system 100. For example, the wireless communications system 200 illustrates communication between a UE 115 and a base station 105 via a communication link 205, and the UE 115 and the base station 105 may be examples of corresponding devices described herein, including with reference to FIG. 1. In some examples, the UE 115 and the base station 105 may perform a BFD procedure to maintain a reliability of the communication link 205 and, as part of the BFD procedure, the UE 115 may autonomously select a BFI counting scheme from a set of BFI counting schemes and monitor for BFD in accordance with the selected BFI counting scheme.

In some systems, a base station 105 may configure the criteria associated with a BFI counting procedure and a UE 115 may lack autonomy or an ability to adjust or tailor the criteria to suit a scenario or a condition of the UE 115. In such systems, for example, the base station 105 may configure a reference signal 220, which may be an example of a BFD reference signal (BFD-RS), and may configure the BFI criteria according to which the UE 115 is to increment a BFI count. Further, in such systems, the UE 115 may lack any other option for incrementing the BFI count outside of what the base station 105 configures. In other words, the base station 105 may control the UE 115 in BFI counting related procedures, including configuring BFD-RS and BFI determination criteria, among other examples. As such, the UE 115 may perform a BFI counting procedure according to signaling instructions received from the base station 105.

In some cases, the base station 105 may configure the BFI counting procedure such that the UE 115 measures the reference signal 220 (e.g., a periodic BFD-RS) transmitted by the base station using a beam 210 and such that the UE 115 generates a BFI report at a lower layer (e.g., the PHY layer) of the UE 115 for each measurement occasion in which the reference signal 220 satisfies a triggering condition. In some aspects, the triggering condition may be an estimated error rate associated with the reference signal 220 being greater than a threshold error rate. For example, if the UE 115 measures the reference signal 220 during a first measurement occasion and an estimated block error rate (BLER) associated with the first measurement occasion of the reference signal 220 is greater than a threshold BLER (e.g., BLER_threshold), the UE 115 may report BFI from the lower layer and the UE 115 may increment a BFI count by one at a MAC layer of the UE 115 for each reported BFI. In other words, BFI count=BFI counts+1 for each BFI report (e.g., whenever the UE 115 reports BFI from the lower layer). In some aspects, the reference signal 220 may be an example of a BFD-RS, such as a CSI-RS or a synchronization signal block (SSB).

However, the single BFI counting technique may not account for all channel conditions or circumstances of UEs 115, and thus additional functionality associated with BFI counting procedures may be beneficial. According to some aspects, a UE 115, such as the UE 115 illustrated in FIG. 2, may perform some tasks autonomously. Such tasks may include BFI counting techniques and, in some examples, may be based on machine learning or other functionality of the UE 115. As such, the UE 115 may support some level of autonomy associated with BFI counting techniques or procedures. In some implementations, for example, the UE 115 may select a BFI counting scheme from a set of BFI counting schemes and may use the selected BFI counting scheme as part of a BFD procedure, where different BFI counting schemes may refer to different manners according to which the UE 115 may increment a BFI count in view of one or more BFI reports (e.g., from the lower layer).

The UE 115 may acquire, receive, or obtain the set of BFI counting schemes from which the UE 115 is able to select a BFI counting scheme in various ways. In some implementations, for example, the base station 105 may signal or configure multiple options for BFI counting schemes from which the UE 115 may autonomously choose. In such implementations, the base station 105 may transmit control signaling 215 including an indication of the set of BFI counting schemes. The base station 105 may transmit the control signaling 215 including the indication of the set of BFI counting schemes via Layer 1 (L1) signaling, such as downlink control information (DCI), Layer (L2) signaling, such as a MAC control element (MAC-CE), or Layer 3 (L3) signaling, such as RRC signaling. Additionally or alternatively, the UE 115 may be equipped, pre-configured, or pre-loaded with the multiple options for BFI counting schemes and may select a BFI counting scheme from the equipped, pre-configured, or pre-loaded BFI counting schemes. In either or both of the examples in which the UE 115 receives an indication of the set of BFI counting schemes or the examples in which the UE 115 is pre-configured with the set of BFI counting schemes, the UE 115 may select one BFI counting scheme from the multiple different options for BFI counting schemes and may use the selected BFI counting scheme to increment a BFI count at the UE 115 as part of a BFD procedure.

The multiple options for BFI counting schemes may include one or more types of interference-aware counting methods or one or more machine learning counting methods, or any combination thereof. For example, one of the set of multiple BFI counting schemes may include a first type of interference-aware counting method according to which the UE 115 may focus on consecutive BFI reports (e.g., consecutive BFIs counts). In accordance with the first type of interference-aware counting method, the UE 115 may count (e.g., increment the BFI count) a certain quantity (e.g., BFIConsecutive) of consecutive BFI reports as a quantity determined by a function of the certain quantity (e.g., BFIConsecutive). Such a function may be described as $f$(BFIConsecutive) and may output a number of BFI counts (e.g., a value to use to increment the BFI count). In some aspects, the function may be associated with a constraint where $f(x)<x$. In other words, the output of the function $f(x)$, the output being a number of BFI counts, may be less than x, x referring to BFIConsecutive.

As such, in accordance with the first type of interference-aware counting method, the UE 115 may increment the BFI count by a first number for each second number of BFI reports, where the first number is less than the second number. For example, the UE 115 may increment the BFI count by one for every two consecutive BFI reports, by one for every three consecutive BFI reports, by two for every three consecutive BFI reports, or by one for every four consecutive BFI reports, among other examples. In some aspects, the UE 115 may employ such a counting method based on applying a fixed ratio to consecutive BFI reports to determine by how much to increment the BFI count. In scenarios in which a quantity of consecutive BFI reports does not divide evenly by the ratio, the UE 115 may count any remainder of BFI reports as an increment of one to the BFI count or as an increment of some fraction of a number to the BFI count. In some aspects, such a relatively smaller increment to the BFI count than a corresponding quantity of consecutive BFI counts may mitigate the influence of glitches or avoid BFD as a result of a temporary signal deterioration (e.g., which may arise due to temporary interference).

Additionally or alternatively, another one of the set of multiple BFI counting schemes may include a second type of interference-aware counting method according to which the UE 115 may focus on a relatively more dynamic counting of consecutive BFI reports. For example, the UE 115 may use a dynamic counting function $y=f$(BFIConsecutive) according to which the UE 115 may increase or increment the BFI count relatively slowly if a number of consecutive BFI reports is relatively small (e.g., less than a threshold) and according to which the UE 115 may increase or increment the BFI count relatively quickly if the number of consecutive BFI reports is relatively large (e.g., greater than the threshold). In some implementations, for example, the UE 115 may increment the BFI count by a first number for each second number of consecutive BFI reports if a set of consecutive BFI reports includes a quantity of BFI reports that is less than a threshold and may increment the BFI count by a third number for each fourth number of consecutive BFI reports if the set of consecutive BFI reports includes a quantity of BFI reports that is greater than the threshold.

As such, relatively smaller sets of consecutive BFI reports may have a relatively smaller contribution to a total BFI count while relatively larger sets of consecutive BFI reports may have a relatively larger contribution to the total BFI count. For example, relatively smaller sets of consecutive BFI reports may be associated with a temporary signal deterioration (e.g., due to temporary interference) while relatively larger sets of consecutive BFI reports may be associated with a relatively longer lasting signal deterioration (e.g., due to a blocking). Accordingly, the UE 115 may weight BFI count contributions from relatively smaller sets of consecutive BFI reports less than BFI count contributions from relatively larger sets of consecutive BFI reports (such that the UE may detect beam failure relatively faster in scenarios in which blocking or some other condition associated with relatively longer lasting signal deterioration is likely). In some aspects, $y=f$(BFIConsecutive) may be described as an exponential function, a piecewise-defined function, or any other function such that a slope of y vs. BFI_count progressively increases as BFI_count increases.

Additionally or alternatively, another one of the set of multiple BFI counting schemes may include a third type of interference-aware counting method according to which the UE 115 may maintain separate counting for all BFIs and consecutive BFIs. In other words, for example, the UE 115 may maintain a first BFI count that focuses on consecutive BFI counts (e.g., such as the first type or the second type of interference-aware counting methods) and a second BFI count that increments by one for each BFI report (e.g., such that the second BFI count increases by one whenever BFI is reported from the lower layer). The first BFI count may be referred to herein as B_consecutive BFI count and the second BFI count may be referred to herein as B_total BFI count. As such, the first BFI count may increase in accordance with the first type of interference-aware counting method (e.g., $f$(BFIConsecutive) where $f(x)<x$) or the second type of interference-aware counting method (e.g., $y=f$(BFIConsecutive) where y dynamically adjusts the contribution of consecutive BFI reports based on a quantity of the set of consecutive BFI reports) and the second BFI count may increase by one for every BFI report. In examples in which the UE 115 selects to use the third type of interference-aware counting method, the UE 115 may detect or declare beam failure if either or both of the first BFI count (e.g., B_consecutive) or the second BFI count (e.g., B_total) satisfies a threshold (e.g., a maxCount threshold). In some examples, the UE 115 may detect or declare beam failure if either the first BFI count (e.g., B_consecutive) satisfies a first threshold (e.g., maxCountConsecutive) or the second BFI count (e.g., B_total) satisfies a second threshold (e.g., a maxCountTotal).

Additionally or alternatively, another one of the set of multiple BFI counting schemes may include a machine learning-guided counting method according to which the UE 115 may determine a total BFI count based on an output of a machine learning algorithm. For example, the UE 115 may input BFI reports or one or more channel measurements, or any combination thereof, into the machine learning algorithm (e.g., a neural network) and may obtain, as an output of the machine learning algorithm, the total BFI counts. In some aspects, the one or more channel measurements may include one or more of a signal-to-interference-plus-noise ratio (SINR) measurement, an SNR measurement, a reference signal receive power (RSRP) measurement, or an interference measurement. The UE 115 may perform the operations or computations associated with the machine learning algorithm at the PHY layer, at the MAC layer, or between the PHY layer and the MAC layer. In some examples, such as in examples in which the UE 115 performs the operations or computations associated with the machine learning algorithm at the PHY layer or between the PHY layer and the MAC layer, the UE 115 may report the BFI counts obtained from the machine learning algorithm from the lower layer (e.g., the PHY layer) to the MAC layer for beam failure determination.

In some examples in which the UE 115 employs the machine learning-guided counting method, the UE 115 may receive, from the base station 105, feedback associated with the determining of the BFI count in accordance with the output of the machine learning algorithm. For example, the base station 105 may evaluate whether the output of the machine learning algorithm correctly or incorrectly detected a beam failure and may transmit that feedback to the UE 115. In such examples in which the UE 115 receives feedback from the base station 105 about an accuracy of the machine learning algorithm to detect beam failure, the UE 115 may adjust one or more parameters or weights associated with the machine learning algorithm based on the feedback received from the base station 105. Additionally or alternatively, the UE 115 may train or adjust the parameters associated with the machine learning algorithm offline.

In some implementations, the UE 115 and the base station 105 may support other signaling to support autonomous selection of a BFI counting scheme from the set of BFI counting schemes at the UE 115. For example, the UE 115 may transmit, to the base station 105, an indication of a UE capability for autonomous selection of a BFI counting scheme. Such UE capability signaling may include an indication of one or more machine learning features or capabilities of the UE 115, a processing power or capacity of the UE 115, a memory size or space of the UE 115, or computation resources of the UE 115, among other example capabilities of the UE 115 associated with processing, computation, or autonomous operation. The UE 115 may transmit the indication of the UE capability for autonomous selection of a BFI counting scheme via a MAC-CE or via uplink control information (UCI) and, in some examples, may transmit the capability to the base station 105 during connection establishment (e.g., via a random access channel (RACH) message or another message associated with establishing a connection with the base station 105).

Further, in some implementations, the UE 115 and the base station 105 may support signaling associated with activation of autonomous selection at the UE 115, deactivation of autonomous selection at the UE 115, or changes to an autonomy level of the UE 115 for selection of a BFI counting scheme. For example, the base station 105 may transmit control signaling 215 activating or deactivating autonomous selection of a BFI counting scheme at the UE 115 (e.g., based on the reported capability of the UE 115 for autonomous operation). The base station 105 may transmit the control signaling 215 activating or deactivating autonomous selection of a BFI counting scheme at the UE 115 via a MAC-CE or via DCI.

Additionally or alternatively, the UE 115 may request an activation or a deactivation of autonomous selection of a BFI counting scheme at the UE 115 and the base station 105 may transmit signaling activating or deactivating the autonomous selection based on the request received from the UE 115. The UE 115 may transmit such a request for activation or deactivation via a MAC-CE or via UCI. Additionally or alternatively, the base station 105 transmit control signaling 215 changing an autonomy level of the UE 115. For example, the base station 105 may transmit the control signaling 215 changing the autonomy level of the UE 115 based on transmitting signaling indicating a change to the set of BFI counting schemes from which the UE 115 is able to select a BFI counting scheme or indicating a change to an available subset of the set of BFI counting schemes (e.g., such that the UE 115 selects from the available subset). In some examples, for instance, the base station 105 may reduce the autonomy level of the UE 115 based on reducing an amount of BFI counting schemes from which the UE 115 is able to select. Alternatively, the UE 115 may increase the autonomy level of the UE 115 based on increasing an amount of BFI counting schemes from which the UE 115 is able to select.

As such, the UE 115 and the base station 105 may support autonomous selection of a BFI counting scheme at the UE 115, which may improve reaction time and reduce UE processing delay, relax usage of resources by the base station 105 to control the UE 115, and improve BFD accuracy. For example, the UE 115 may use the selected BFI counting scheme to increment a BFI count while measuring the reference signal 220 transmitted by the base station using the beam 210 to determine whether the beam 210 provides a sufficient signal quality for the UE 115, which may enable the UE 115 and the base station 105 may maintain reliable communication via the communication link 205.

Figure 3:
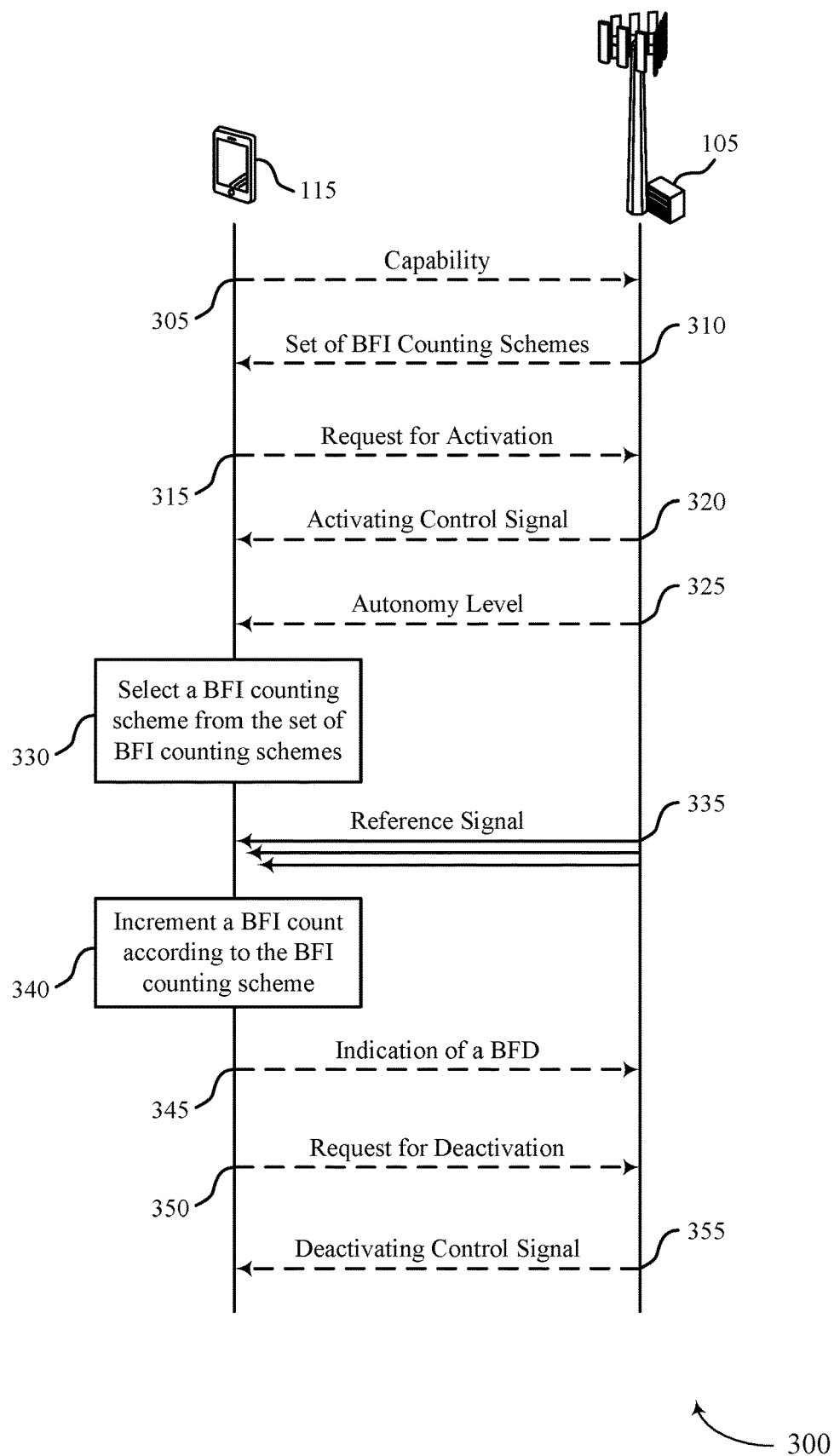
FIG. 3 illustrates an example of a process flow that supports techniques for autonomous BFI counting in accordance with aspects of the present disclosure.

FIG. 3 illustrates an example of a process flow 300 that supports techniques for autonomous BFI counting in accordance with aspects of the present disclosure. The process flow 300 may implement or be implemented to realize aspects of the wireless communications system 100 or the wireless communications system 200. For example, the process flow illustrates communication between a UE 115 and a base station 105, which may be examples of corresponding devices described herein, including with reference to FIGS. 1 and 2. In some examples, the UE 115 and the base station 105 may support autonomous selection of a BFI counting scheme at the UE 115, which may enable to the UE 115 to employ an autonomous BFI counting design for a BFD procedure.

In the following description of the process flow 300, the operations may be performed (such as reported or provided) in a different order than the order shown, or the operations performed by the example devices may be performed in different orders or at different times. Some operations also may be omitted from the process flow 300, or other operations may be added to the process flow 300. Further, although some operations or signaling may be shown to occur at different times for discussion purposes, these operations may actually occur at the same time or otherwise concurrently.

At 305, the UE 115 may, in some implementations, transmit, to the base station 105, an indication of a capability of the UE 115 associated with autonomous selection of a BFI counting scheme from a set of BFI counting schemes at the UE 115. Such UE capability signaling may include an indication of one or more machine learning features or capabilities of the UE 115, a processing power or capacity of the UE 115, a memory size or space of the UE 115, and computation resources of the UE 115, among other example capabilities of the UE 115 associated with processing, computation, and autonomous operation. The UE 115 may transmit the indication of the capability of the UE 115 via a MAC-CE or via UCI.

At 310, the UE 115 may, in some implementations, receive, from the base station 105, an indication of the set of BFI counting schemes. The UE 115 may receive the indication via DCI, a MAC-CE, or via RRC signaling. Additionally or alternatively, the set of BFI counting schemes may be pre-configured at the UE 115.

At 315, the UE 115 may, in some implementations, transmit, to the base station 105, a request for activation of autonomous selection of the BFI counting scheme from the set of BFI counting schemes. The UE 115 may transmit the request via a MAC-CE or via UCI.

At 320, the UE 115 may, in some implementations, receive, from the base station 105, a control signal activating autonomous selection of the BFI counting scheme from the set of BFI counting schemes at the UE 115. In some examples, the UE 115 may receive the control signal activating the autonomous selection based on transmitting the request at 315. The UE 115 may receive the control signal activating the autonomous selection via a MAC-CE or via DCI.

At 325, the UE 115 may, in some implementations, receive, from the base station 105, a control signal indicating an autonomy level of the UE 115. In some examples, the autonomy level may be associated with one or more of a quantity of the set of BFI counting schemes or available BFI counting schemes within the set of BFI counting schemes. The UE 115 may receive the control signal indicating the autonomy level of the UE 115 via a MAC-CE or via DCI.

At 330, the UE 115 may select, at the UE 115, a BFI counting scheme from the set of (available) BFI counting schemes. In some examples, the UE 115 may make such a selection of the BFI counting scheme autonomously and based on one or more of a deployment scenario of the UE 115, a condition (e.g., a channel quality condition or link condition) of the UE 115, a type of the UE 115, a service type associated with the UE 115, a battery power of the UE 115, a processing capability or availability of the UE 115, or any combination thereof.

At 335, the UE 115 may measure a reference signal transmitted by the base station 105 during multiple measurement occasions associated with BFD. For example, the base station 105 may transmit the reference signal, which may be an example of a BFD-RS, periodically during the multiple measurement occasions (e.g., such that the measurement occasions occur periodically). As such, the UE 115 may receive and measure the reference signal during each of the multiple measurement occasions.

At 340, the UE 115 may increment a BFI count according to the BFI counting scheme and based on measuring the reference signal. For example, the UE 115 may generate a BFI report for each measurement occasion of the reference signal during which the UE 115 measures an error rate greater than a threshold error rate, may indicate, from a lower layer (e.g., the PHY layer) of the UE 115 to an upper layer (e.g., the MAC layer) of the UE 115, each generated BFI report, and the UE 115 may increment the BFI count based on the BFI reports and the selected BFI counting scheme. Additional details relating to the various BFI counting schemes that the UE 115 may use are described herein, including with reference to FIG. 2.

At 345, the UE 115 may selectively transmit an indication of a BFD based on the BFI count. For example, the UE 115 may transmit the indication of the BFD to the base station 105 if the BFI count exceeds a threshold count prior to expiration of a timer (e.g., a BFD timer). Alternatively, the UE 115 may refrain from transmitting the indication of the BFD to the base station 105 if the BFI count is less than the threshold count at expiration of the timer (e.g., the BFD timer).

At 350, the UE 115 may, in some implementations, transmit, to the base station 105, a request for deactivation of the autonomous selection of the BFI counting scheme from the set of BFI counting schemes. The UE 115 may transmit the request via a MAC-CE or via UCI. Further, although the UE 115 is shown as transmitting the request for deactivation of the autonomous selection at the UE at 350, the UE 115 may additionally or alternatively transmit the request for deactivation of the autonomous selection at the UE 115 at various other times in the process flow 300. For example, the UE 115 may transmit the request after (e.g., any time after) receiving the control signal activating autonomous selection at the UE 115 at 320.

At 355, the UE 115 may, in some implementations, receive, from the base station 105, a control signal deactivating the autonomous selection of the BFI counting scheme from the set of BFI counting schemes at the UE 115. In some examples, the UE 115 may receive the control signal deactivating the autonomous selection based on transmitting the request at 350. The UE 115 may receive the control signal deactivating the autonomous selection via a MAC-CE or via DCI. Further, although the UE 115 is shown as receiving the control signal deactivating the autonomous selection at the UE 115 at 355, the UE 115 may additionally or alternatively receive the control signal deactivating the autonomous selection at the UE 115 at various other times in the process flow 300. For example, the UE 115 may receive the control signal deactivating the autonomous selection at the UE 115 after (e.g., any time after) receiving the control signal activating autonomous selection at the UE 115 at 320.

Figure 4:
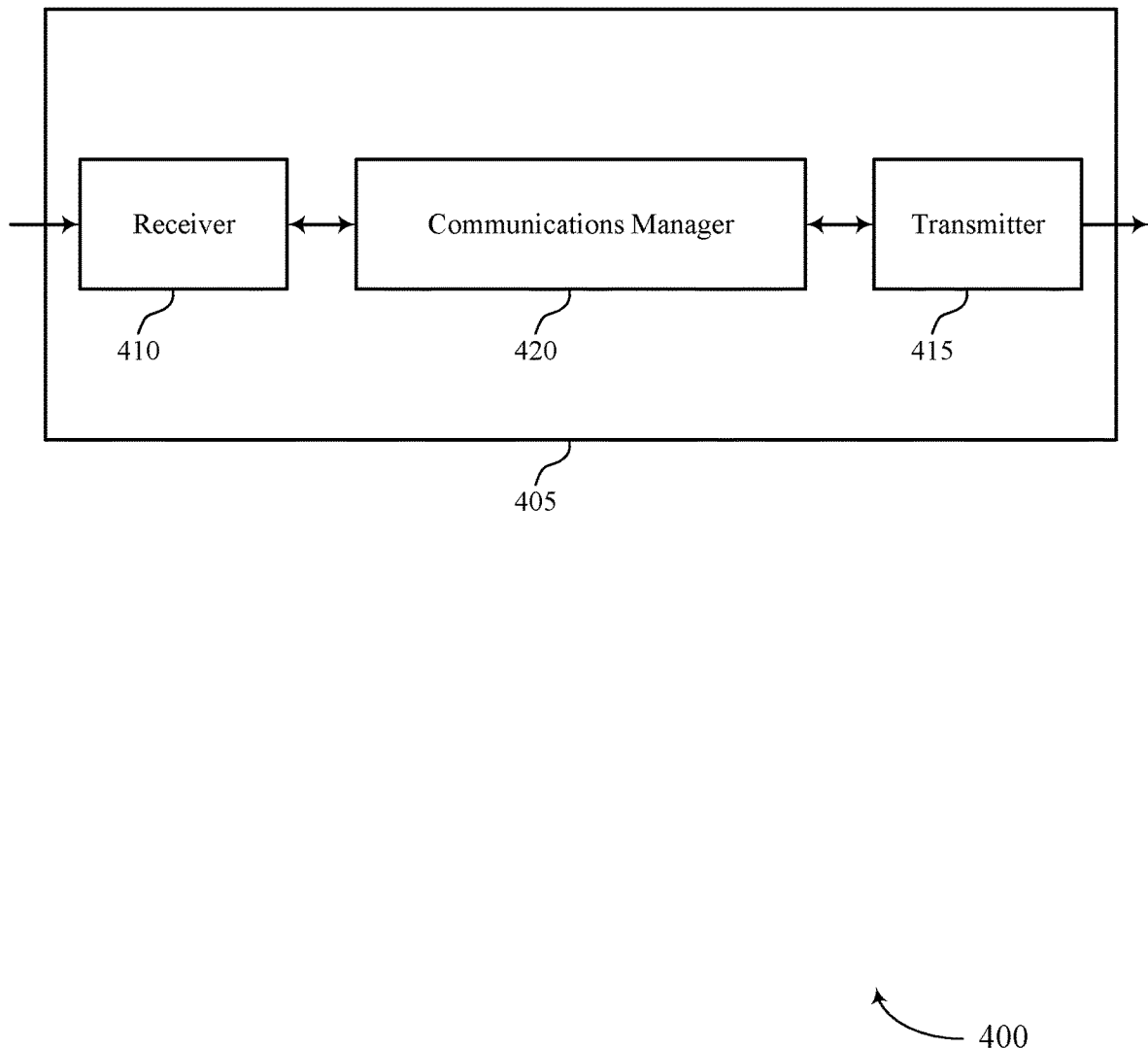
FIGS. 4 and 5 show block diagrams of devices that support techniques for autonomous BFI counting in accordance with aspects of the present disclosure.

FIG. 4 shows a block diagram 400 of a device 405 that supports techniques for autonomous BFI counting in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for autonomous BFI counting). Information may be passed on to other components of the device 405. The receiver 410 may utilize a single antenna or a set of multiple antennas.

The transmitter 415 may provide a means for transmitting signals generated by other components of the device 405.

For example, the transmitter 415 may transmit information such as packets, user data, control information, or any combination thereof associated with various information channels (e.g., control channels, data channels, information channels related to techniques for autonomous BFI counting). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for autonomous BFI counting as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for selecting, at the UE, a BFI counting scheme from a set of BFI counting schemes. The communications manager 420 may be configured as or otherwise support a means for measuring a reference signal transmitted by a base station during a set of multiple measurement occasions associated with BFD. The communications manager 420 may be configured as or otherwise support a means for incrementing a BFI count according to the BFI counting scheme and based on measuring the reference signal. The communications manager 420 may be configured as or otherwise support a means for selectively transmitting, to the base station, an indication of a BFD based on the BFI count.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
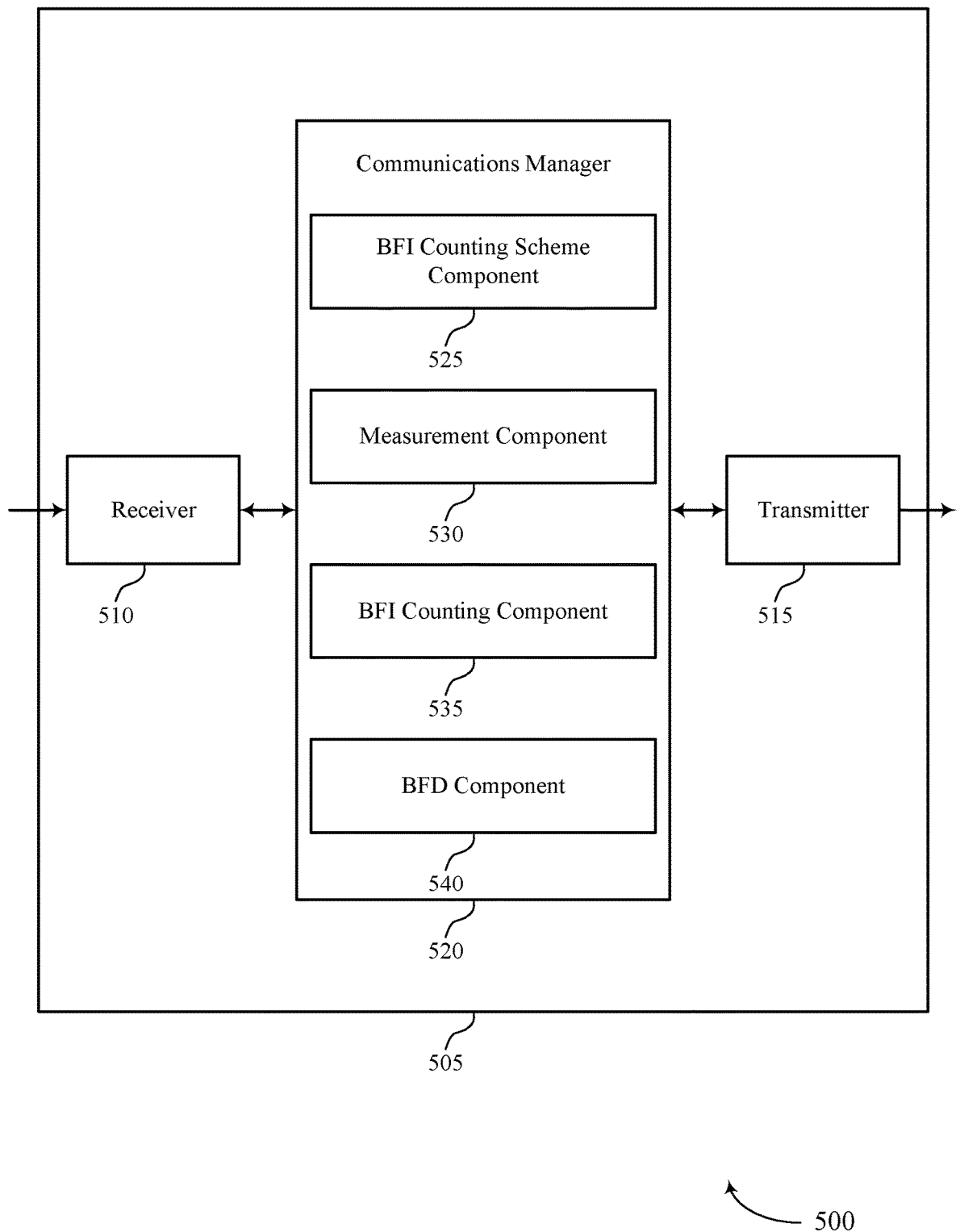

FIG. 5 shows a block diagram 500 of a device 505 that supports techniques for autonomous BFI counting in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for autonomous BFI counting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for autonomous BFI counting). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for autonomous BFI counting as described herein. For example, the communications manager 520 may include a BFI counting scheme component 525, a measurement component 530, a BFI counting component 535, an BFD component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The BFI counting scheme component 525 may be configured as or otherwise support a means for selecting, at the UE, a BFI counting scheme from a set of BFI counting schemes. The measurement component 530 may be configured as or otherwise support a means for measuring a reference signal transmitted by a base station during a set of multiple measurement occasions associated with BFD. The BFI counting component 535 may be configured as or otherwise support a means for incrementing a BFI count according to the BFI counting scheme and based on measuring the reference signal. The BFD component 540 may be configured as or otherwise support a means for selectively transmitting, to the base station, an indication of a BFD based on the BFI count.

Figure 6:
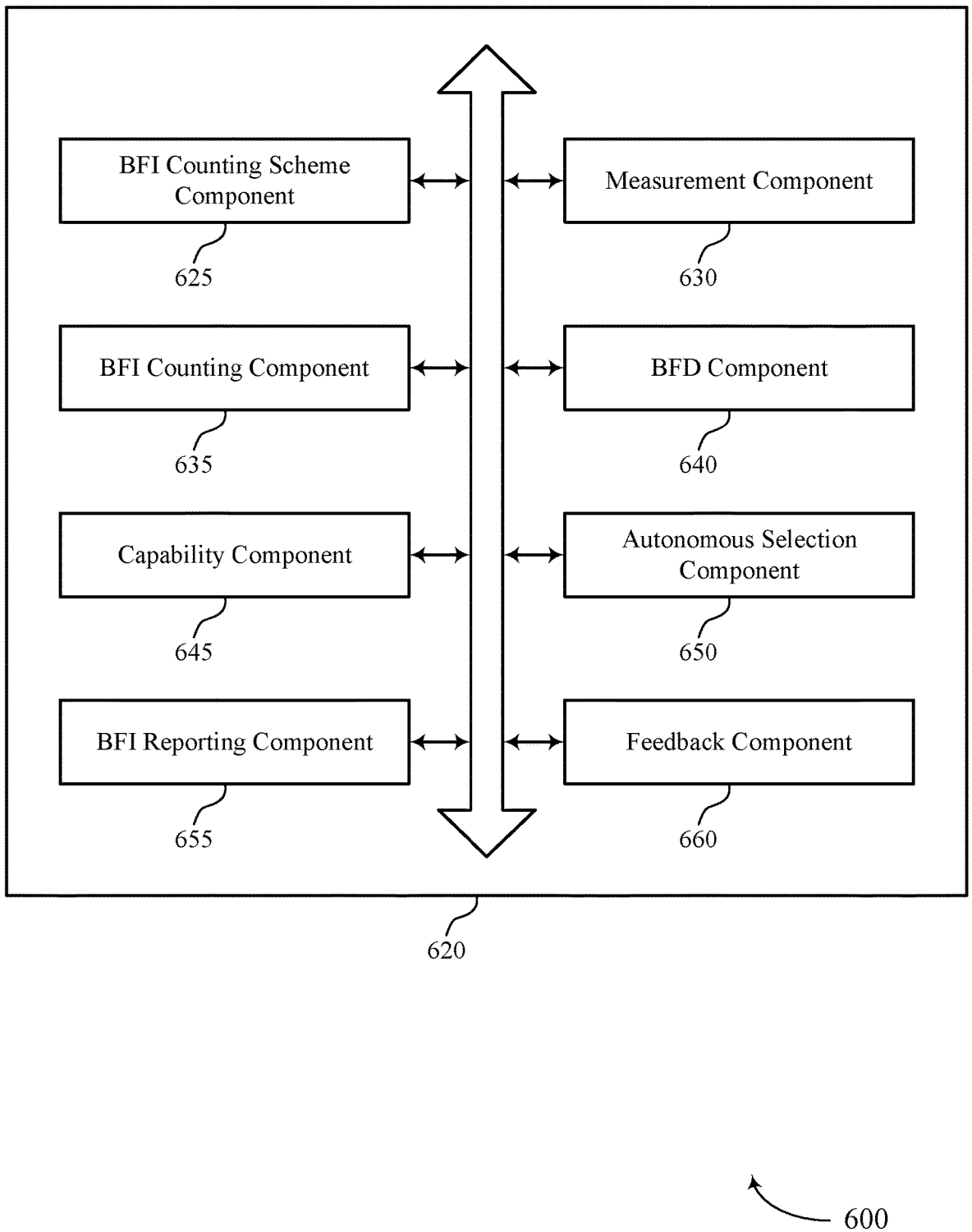
FIG. 6 shows a block diagram of a communications manager that supports techniques for autonomous BFI counting in accordance with aspects of the present disclosure.

FIG. 6 shows a block diagram 600 of a communications manager 620 that supports techniques for autonomous BFI counting in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for autonomous BFI counting as described herein. For example, the communications manager 620 may include a BFI counting scheme component 625, a measurement component 630, a BFI counting component 635, an BFD component 640, a capability component 645, an autonomous selection component 650, a BFI reporting component 655, a feedback component 660, or any combination thereof. Each of these components may communicate, directly or indirectly, with one another (e.g., via one or more buses).

The communications manager 620 may support wireless communication at a UE in accordance with examples as disclosed herein. The BFI counting scheme component 625 may be configured as or otherwise support a means for selecting, at the UE, a BFI counting scheme from a set of BFI counting schemes. The measurement component 630 may be configured as or otherwise support a means for measuring a reference signal transmitted by a base station during a set of multiple measurement occasions associated with BFD. The BFI counting component 635 may be configured as or otherwise support a means for incrementing a BFI count according to the BFI counting scheme and based on measuring the reference signal. The BFD component 640 may be configured as or otherwise support a means for selectively transmitting, to the base station, an indication of a BFD based on the BFI count.

In some examples, the capability component 645 may be configured as or otherwise support a means for transmitting, to the base station, an indication of a capability of the UE associated with autonomous selection of the BFI counting scheme from the set of BFI counting schemes at the UE, where selecting the BFI counting scheme from the set of BFI counting schemes is based on the capability of the UE associated with the autonomous selection of the BFI counting scheme at the UE.

In some examples, the autonomous selection component 650 may be configured as or otherwise support a means for receiving, from the base station, a control signal activating autonomous selection of the BFI counting scheme from the set of BFI counting schemes at the UE, where selecting the BFI counting scheme from the set of BFI counting schemes is based on receiving the control signal activating the autonomous selection of the BFI counting scheme at the UE.

In some examples, the autonomous selection component 650 may be configured as or otherwise support a means for receiving, from the base station, a control signal deactivating autonomous selection of the BFI counting scheme from the set of BFI counting schemes at the UE. In some examples, the BFI counting scheme component 625 may be configured as or otherwise support a means for receiving, from the base station, a configuration associated with a single BFI counting scheme.

In some examples, the autonomous selection component 650 may be configured as or otherwise support a means for receiving, from the base station, a control signal indicating an autonomy level of the UE, where the autonomy level is associated with one or more of a quantity of the set of BFI counting schemes or available schemes within the set of BFI counting schemes, and where selecting the BFI counting scheme from the set of BFI counting schemes is based on the autonomy level of the UE.

In some examples, the autonomous selection component 650 may be configured as or otherwise support a means for transmitting, to the base station, a request for activation or deactivation of autonomous selection of the BFI counting scheme from the set of BFI counting schemes at the UE. In some examples, the autonomous selection component 650 may be configured as or otherwise support a means for receiving, from the base station, a control signaling activating or deactivating the autonomous selection of the BFI counting scheme at the UE in accordance with the request for the activation or the deactivation of the autonomous selection of the BFI counting scheme at the UE.

In some examples, the BFI counting scheme component 625 may be configured as or otherwise support a means for receiving, from the base station, an indication of the set of BFI counting schemes, where selecting the BFI counting scheme from the set of BFI counting schemes is based on receiving the indication of the set of BFI counting schemes.

In some examples, the set of BFI counting schemes are pre-configured at the UE.

In some examples, the BFI reporting component 655 may be configured as or otherwise support a means for indicating, from a lower layer of the UE to an upper layer of the UE and based on the measuring, a BFI report for each measurement occasion of the set of multiple measurement occasions associated with BFD during which the UE measures that an error rate associated with the reference signal is greater than a threshold error rate.

In some examples, to support incrementing the BFI count according to the BFI counting scheme and based on measuring the reference signal, the BFI counting component 635 may be configured as or otherwise support a means for incrementing the BFI count by a first number for each second number of consecutive BFI reports, where the first number is less than the second number.

In some examples, to support incrementing the BFI count according to the BFI counting scheme and based on measuring the reference signal, the BFI counting component 635 may be configured as or otherwise support a means for incrementing the BFI count by a first number for each second number of consecutive BFI reports of a set of consecutive BFI reports if the set of consecutive BFI reports includes less than a threshold quantity of consecutive BFI reports. In some examples, to support incrementing the BFI count according to the BFI counting scheme and based on measuring the reference signal, the BFI counting component 635 may be configured as or otherwise support a means for incrementing the BFI count by a third number for each fourth number of consecutive BFI reports of the set of consecutive BFI reports if the set of consecutive BFI reports includes greater than the threshold quantity of consecutive BFI reports.

In some examples, to support incrementing the BFI count according to the BFI counting scheme and based on measuring the reference signal, the BFI counting component 635 may be configured as or otherwise support a means for incrementing a second BFI count by one for each of a total number of BFI reports.

In some examples, to support incrementing the BFI count according to the BFI counting scheme and based on measuring the reference signal, the BFI counting component 635 may be configured as or otherwise support a means for determining the BFI count in accordance with an output of a machine learning algorithm based on a number of BFI reports and one or more channel measurements.

In some examples, the feedback component 660 may be configured as or otherwise support a means for receiving, from the base station, feedback associated with the determining of the BFI count in accordance with the output of the machine learning algorithm. In some examples, the BFI counting component 635 may be configured as or otherwise support a means for adjusting one or more parameters associated with the machine learning algorithm based on the feedback.

In some examples, to support selectively transmitting the indication of the BFD, the BFD component 640 may be configured as or otherwise support a means for transmitting the indication of the BFD if the BFI count exceeds a threshold count prior to expiration of a timer.

In some examples, to support selectively transmitting the indication of the BFD, the BFD component 640 may be configured as or otherwise support a means for refraining from transmitting the indication of the BFD if the BFI count is less than a threshold count at expiration of a timer.

In some examples, the reference signal includes a periodic reference signal and the set of multiple measurement occasions associated with BFD are based on a periodicity associated with the periodic reference signal.

Figure 7:
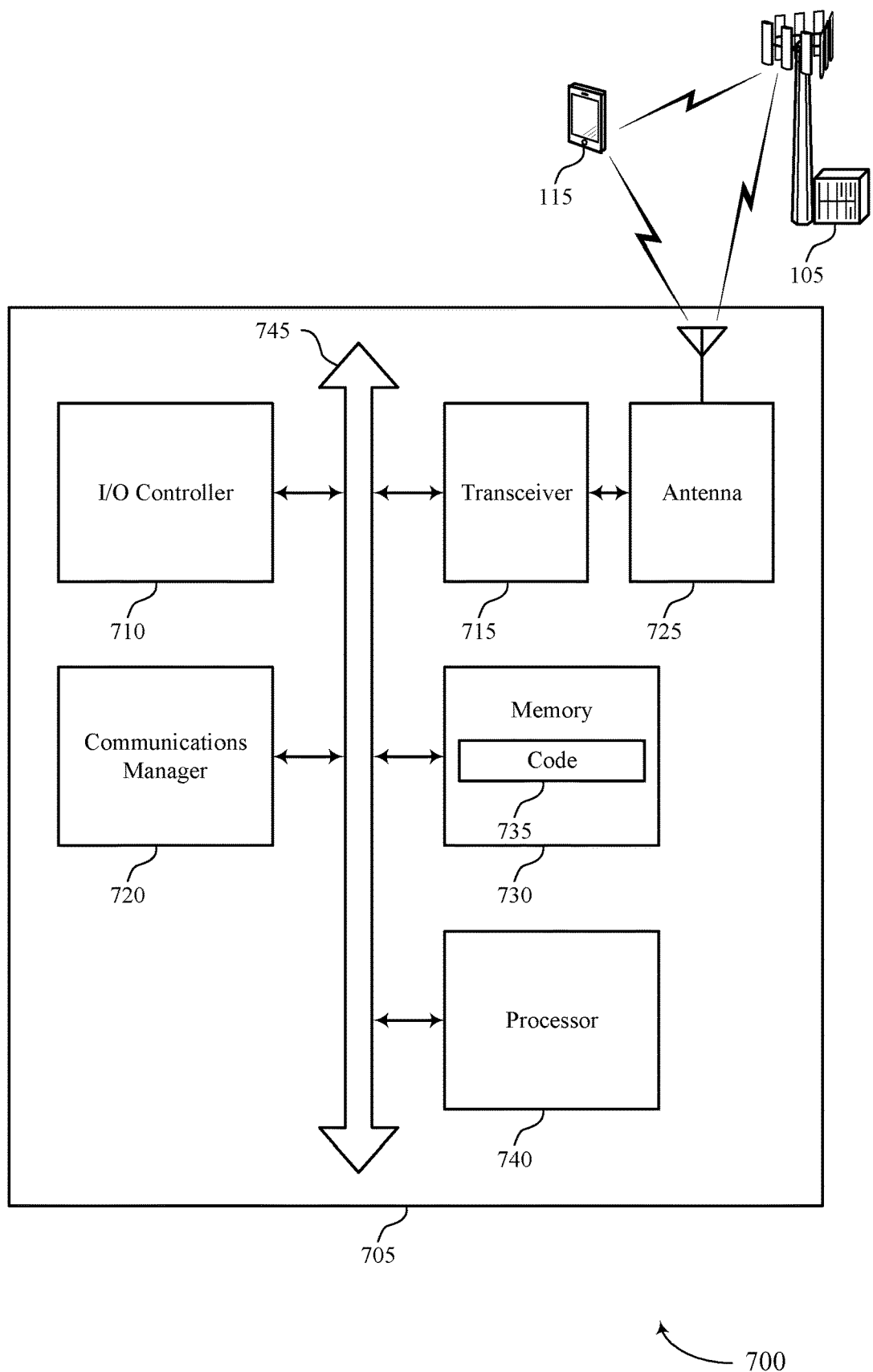
FIG. 7 shows a diagram of a system including a device that supports techniques for autonomous BFI counting in accordance with aspects of the present disclosure.

FIG. 7 shows a diagram of a system 700 including a device 705 that supports techniques for autonomous BFI counting in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS R, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for autonomous BFI counting). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for selecting, at the UE, a BFI counting scheme from a set of BFI counting schemes. The communications manager 720 may be configured as or otherwise support a means for measuring a reference signal transmitted by a base station during a set of multiple measurement occasions associated with BFD. The communications manager 720 may be configured as or otherwise support a means for incrementing a BFI count according to the BFI counting scheme and based on measuring the reference signal. The communications manager 720 may be configured as or otherwise support a means for selectively transmitting, to the base station, an indication of a BFD based on the BFI count.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for autonomous BFI counting as described herein, or the processor 740 and the memory 730 may be otherwise configured to perform or support such operations.

Figure 8:
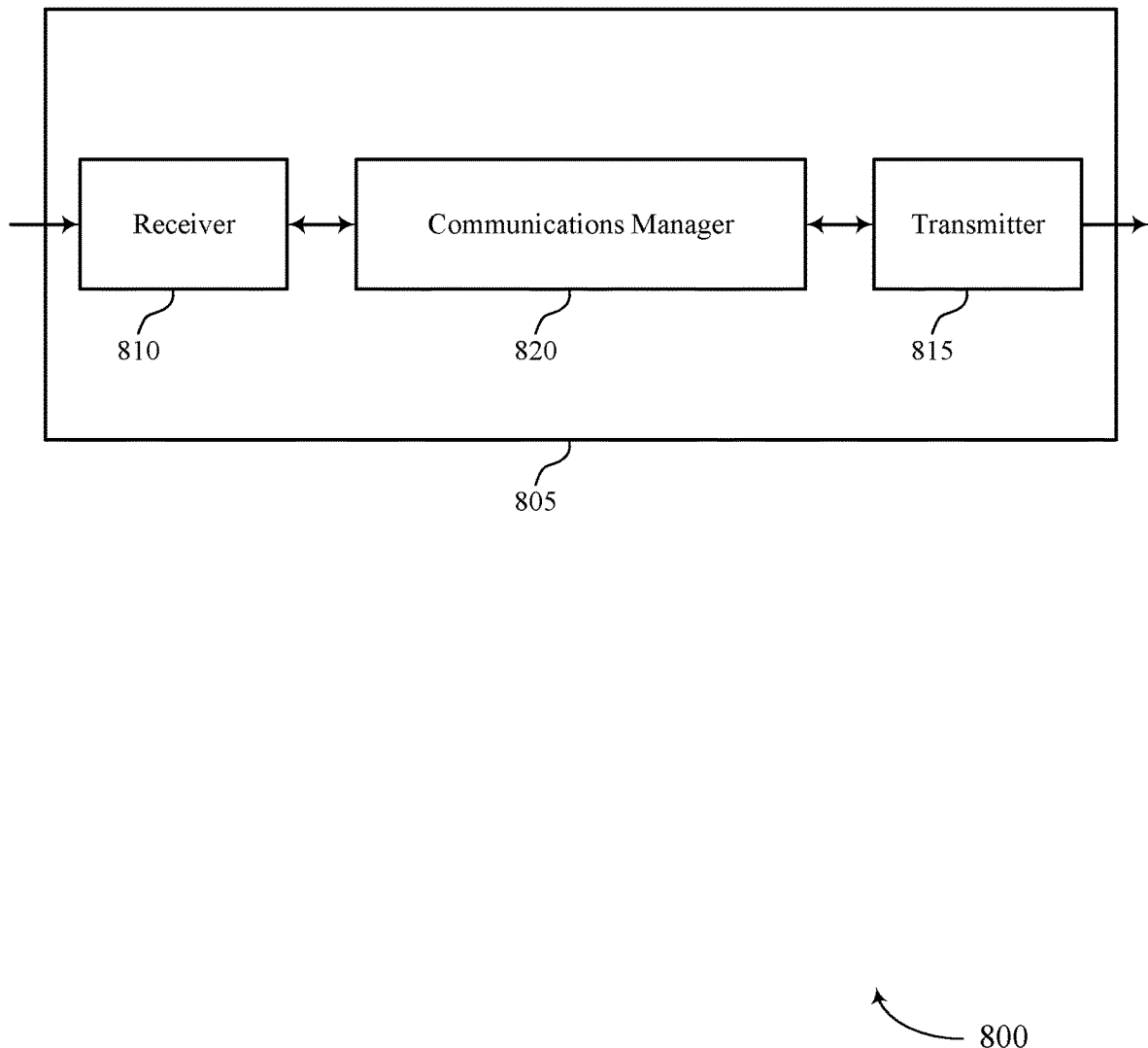
FIGS. 8 and 9 show block diagrams of devices that support techniques for autonomous BFI counting in accordance with aspects of the present disclosure.

FIG. 8 shows a block diagram 800 of a device 805 that supports techniques for autonomous BFI counting in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for autonomous BFI counting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for autonomous BFI counting). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for autonomous BFI counting as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, an indication of a capability of the UE associated with autonomous selection, at the UE, of a BFI counting scheme from a set of BFI counting schemes. The communications manager 820 may be configured as or otherwise support a means for transmitting, to the UE, a first control signal activating the autonomous selection of the BFI counting scheme from the set of BFI counting schemes at the UE based on the capability of the UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources.

Figure 9:
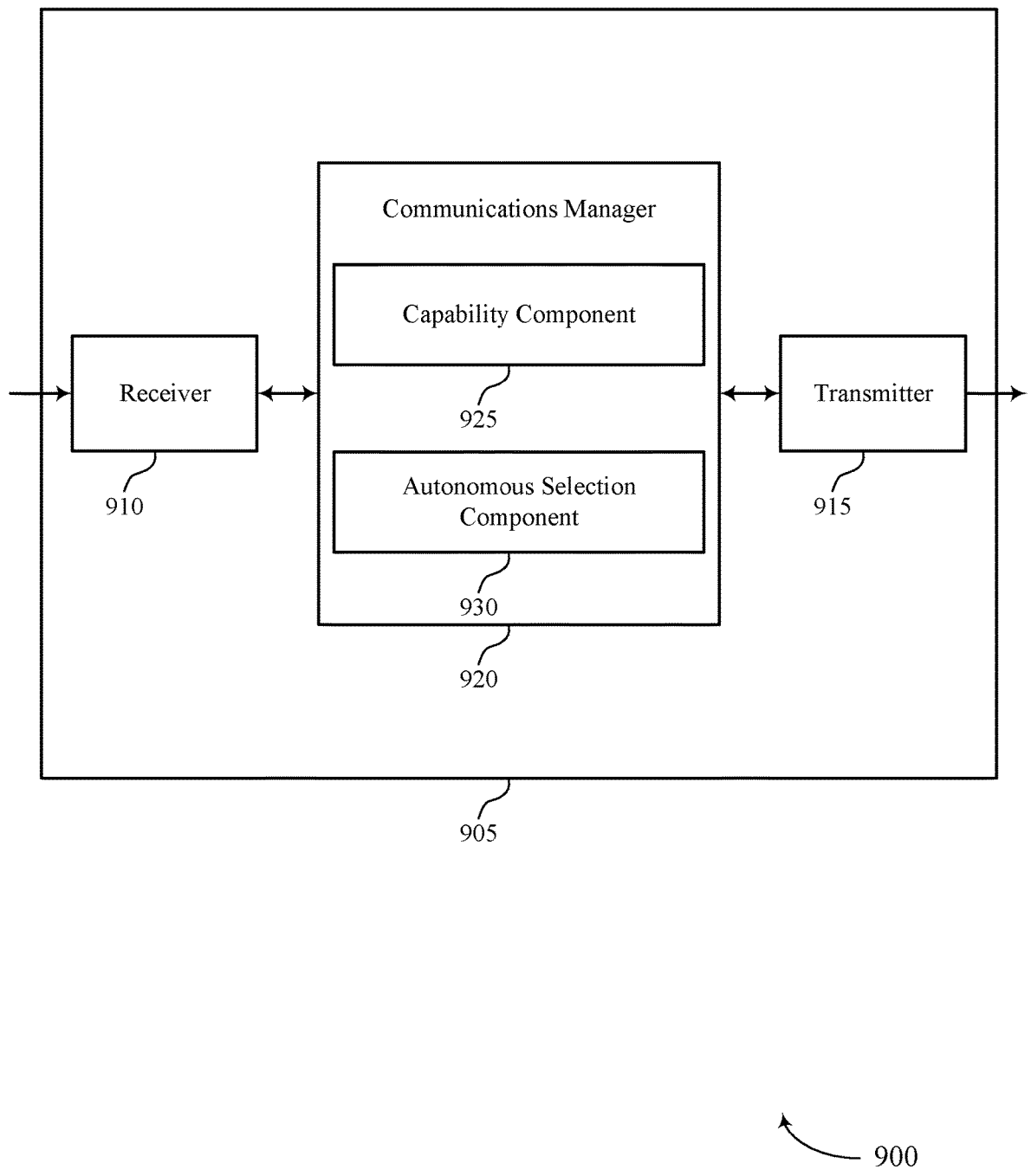

FIG. 9 shows a block diagram 900 of a device 905 that supports techniques for autonomous BFI counting in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for autonomous BFI counting). Information may be passed on to other components of the device 905. The receiver 910 may utilize a single antenna or a set of multiple antennas.

The transmitter 915 may provide a means for transmitting signals generated by other components of the device 905.

For example, the transmitter 915 may transmit information such as packets, user data, control information, or any combination thereof associated with various information channels (e.g., control channels, data channels, information channels related to techniques for autonomous BFI counting). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for autonomous BFI counting as described herein. For example, the communications manager 920 may include a capability component 925 an autonomous selection component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The capability component 925 may be configured as or otherwise support a means for receiving, from a UE, an indication of a capability of the UE associated with autonomous selection, at the UE, of a BFI counting scheme from a set of BFI counting schemes. The autonomous selection component 930 may be configured as or otherwise support a means for transmitting, to the UE, a first control signal activating the autonomous selection of the BFI counting scheme from the set of BFI counting schemes at the UE based on the capability of the UE.

Figure 10:
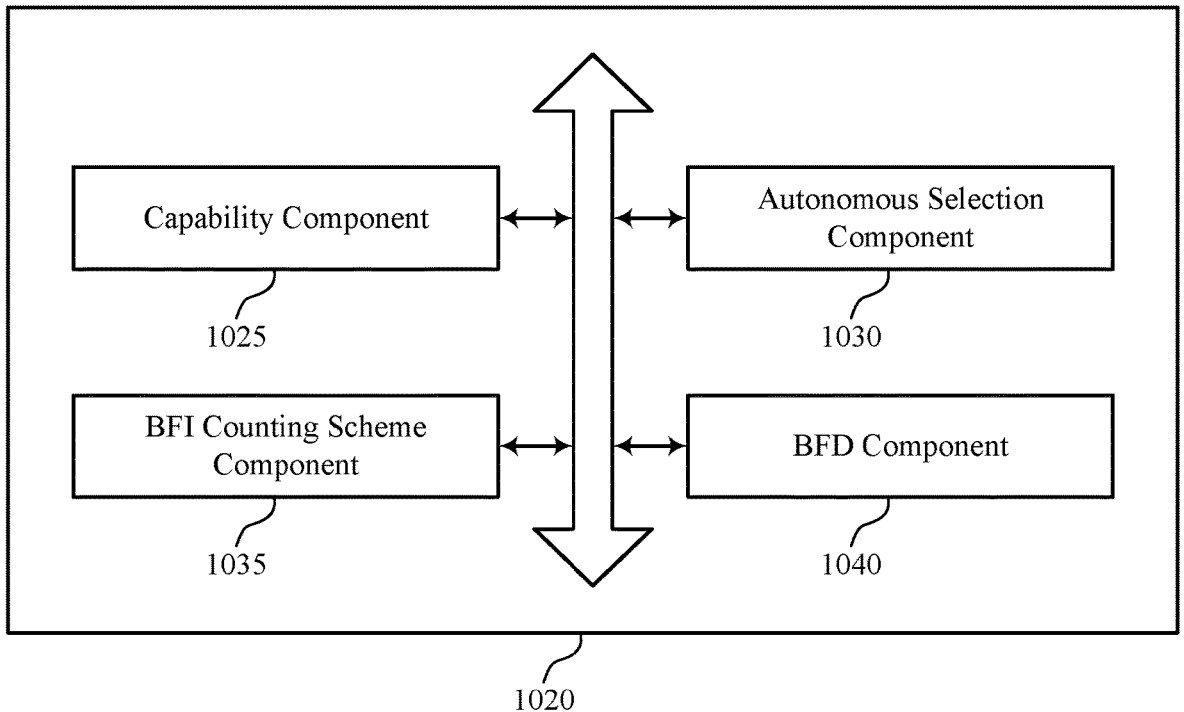
FIG. 10 shows a block diagram of a communications manager that supports techniques for autonomous BFI counting in accordance with aspects of the present disclosure.

FIG. 10 shows a block diagram 1000 of a communications manager 1020 that supports techniques for autonomous BFI counting in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for autonomous BFI counting as described herein. For example, the communications manager 1020 may include a capability component 1025, an autonomous selection component 1030, a BFI counting scheme component 1035, an BFD component 1040, or any combination thereof. Each of these components may communicate, directly or indirectly, with one another (e.g., via one or more buses).

The communications manager 1020 may support wireless communication at a base station in accordance with examples as disclosed herein. The capability component 1025 may be configured as or otherwise support a means for receiving, from a UE, an indication of a capability of the UE associated with autonomous selection, at the UE, of a BFI counting scheme from a set of BFI counting schemes. The autonomous selection component 1030 may be configured as or otherwise support a means for transmitting, to the UE, a first control signal activating the autonomous selection of the BFI counting scheme from the set of BFI counting schemes at the UE based on the capability of the UE.

In some examples, the autonomous selection component 1030 may be configured as or otherwise support a means for transmitting, to the UE, a second control signal indicating an autonomy level of the UE for the autonomous selection of the BFI counting scheme at the UE, where the autonomy level is associated with one or more of a quantity of the set of BFI counting schemes or available schemes within the set of BFI counting schemes.

In some examples, the autonomous selection component 1030 may be configured as or otherwise support a means for receiving, from the UE, a request for activation of the autonomous selection of the BFI counting scheme at the UE, where transmitting the first control signal activating the autonomous selection of the BFI counting scheme at the UE is based on receiving the request.

In some examples, the autonomous selection component 1030 may be configured as or otherwise support a means for transmitting, to the UE, a second control signal deactivating the autonomous selection of the BFI counting scheme at the UE. In some examples, the BFI counting scheme component 1035 may be configured as or otherwise support a means for transmitting, to the UE, a configuration associated with a single BFI counting scheme.

In some examples, the autonomous selection component 1030 may be configured as or otherwise support a means for receiving, from the UE, a request for deactivation of the autonomous selection of the BFI counting scheme at the UE, where transmitting the second control signal deactivating the autonomous selection of the BFI counting scheme at the UE is based on receiving the request.

In some examples, the BFI counting scheme component 1035 may be configured as or otherwise support a means for transmitting, to the UE, an indication of the set of BFI counting schemes, where transmitting the first control signal activating the autonomous selection of the BFI counting scheme from the set of BFI counting schemes at the UE is based on transmitting the indication of the set of BFI counting schemes.

In some examples, the BFD component 1040 may be configured as or otherwise support a means for receiving, from the UE, an indication of a BFD based on activating the autonomous selection of the BFI counting scheme at the UE.

Figure 11:
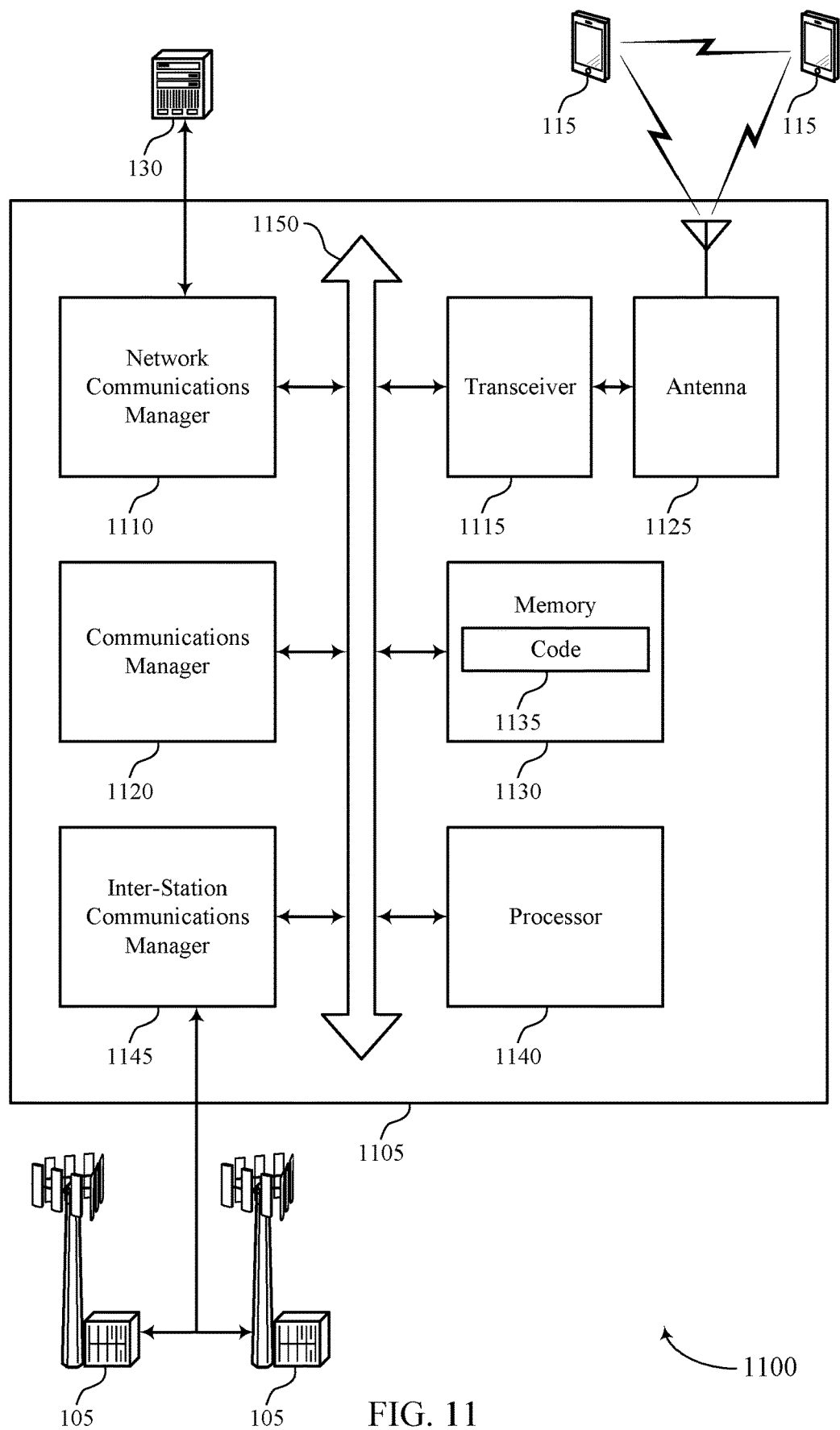
FIG. 11 shows a diagram of a system including a device that supports techniques for autonomous BFI counting in accordance with aspects of the present disclosure.

FIG. 11 shows a diagram of a system 1100 including a device 1105 that supports techniques for autonomous BFI counting in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for autonomous BFI counting). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, an indication of a capability of the UE associated with autonomous selection, at the UE, of a BFI counting scheme from a set of BFI counting schemes. The communications manager 1120 may be configured as or otherwise support a means for transmitting, to the UE, a first control signal activating the autonomous selection of the BFI counting scheme from the set of BFI counting schemes at the UE based on the capability of the UE.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for autonomous BFI counting as described herein, or the processor 1140 and the memory 1130 may be otherwise configured to perform or support such operations.

Figure 12:
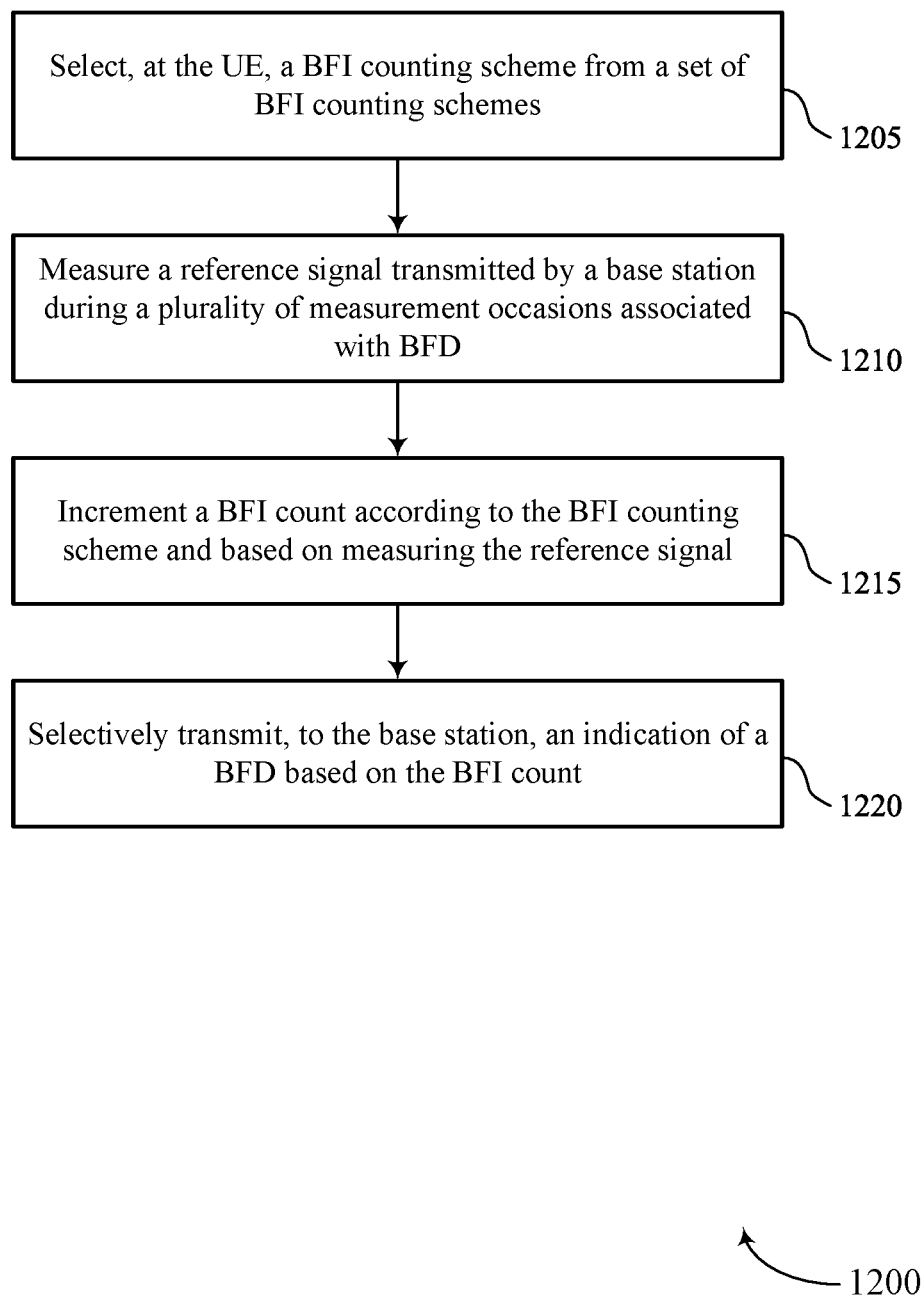
FIGS. 12 through 15 show flowcharts illustrating methods that support techniques for autonomous BFI counting in accordance with aspects of the present disclosure.

FIG. 12 shows a flowchart illustrating a method 1200 that supports techniques for autonomous BFI counting in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include selecting, at the UE, a BFI counting scheme from a set of BFI counting schemes. The operations of 1205 may be performed in accordance with examples as disclosed herein. In some examples, aspects of the operations of 1205 may be performed by a BFI counting scheme component 625 as described with reference to FIG. 6.

At 1210, the method may include measuring a reference signal transmitted by a base station during a set of multiple measurement occasions associated with BFD. The operations of 1210 may be performed in accordance with examples as disclosed herein. In some examples, aspects of the operations of 1210 may be performed by a measurement component 630 as described with reference to FIG. 6.

At 1215, the method may include incrementing a BFI count according to the BFI counting scheme and based on measuring the reference signal. The operations of 1215 may be performed in accordance with examples as disclosed herein. In some examples, aspects of the operations of 1215 may be performed by a BFI counting component 635 as described with reference to FIG. 6.

At 1220, the method may include selectively transmitting, to the base station, an indication of a BFD based on the BFI count. The operations of 1220 may be performed in accordance with examples as disclosed herein. In some examples, aspects of the operations of 1220 may be performed by an BFD component 640 as described with reference to FIG. 6.

Figure 13:
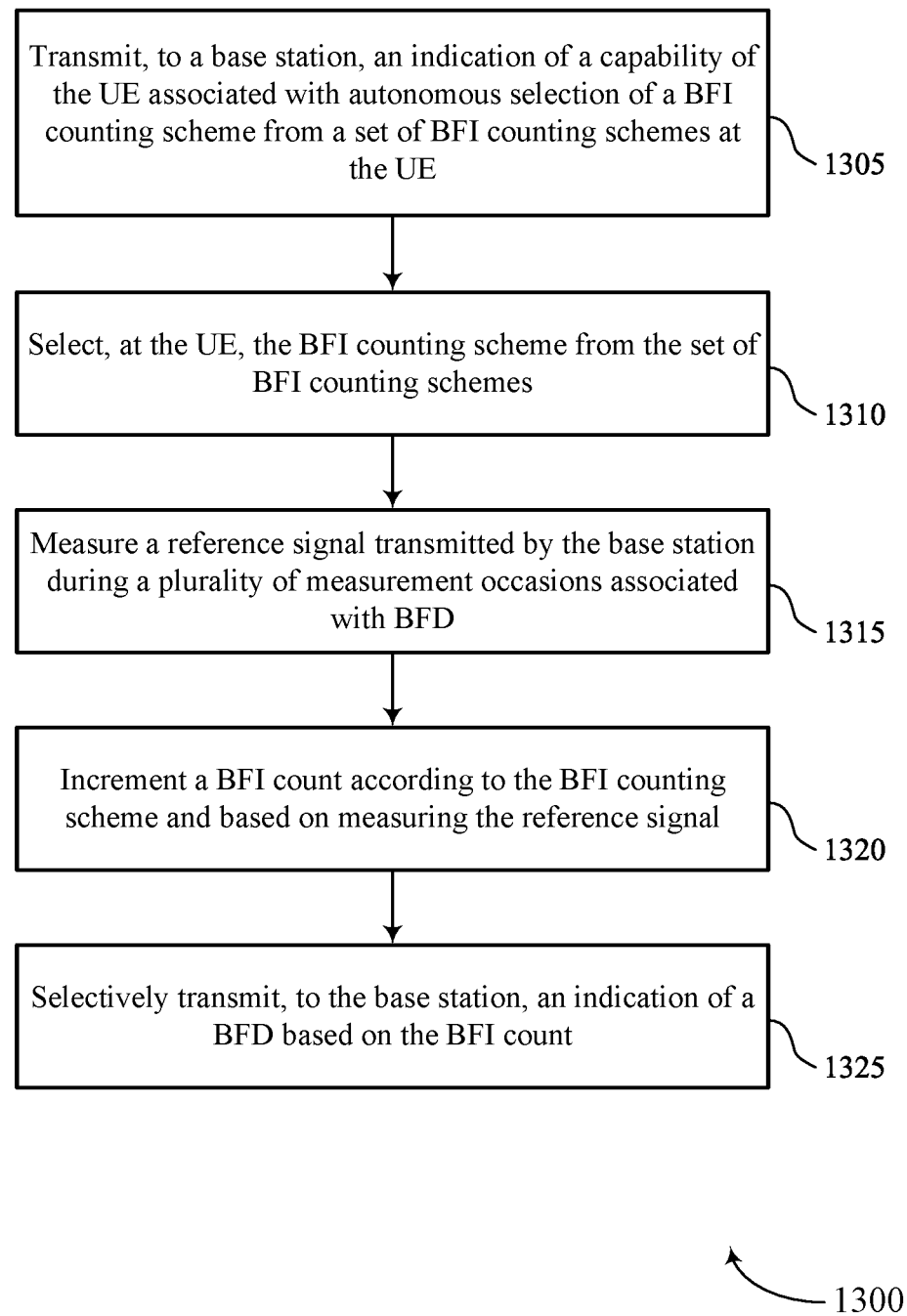

FIG. 13 shows a flowchart illustrating a method 1300 that supports techniques for autonomous BFI counting in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, an indication of a capability of the UE associated with autonomous selection of a BFI counting scheme from a set of BFI counting schemes at the UE. The operations of 1305 may be performed in accordance with examples as disclosed herein. In some examples, aspects of the operations of 1305 may be performed by a capability component 645 as described with reference to FIG. 6.

At 1310, the method may include selecting, at the UE, the BFI counting scheme from the set of BFI counting schemes. The operations of 1310 may be performed in accordance with examples as disclosed herein. In some examples, aspects of the operations of 1310 may be performed by a BFI counting scheme component 625 as described with reference to FIG. 6.

At 1315, the method may include measuring a reference signal transmitted by the base station during a set of multiple measurement occasions associated with BFD. The operations of 1315 may be performed in accordance with examples as disclosed herein. In some examples, aspects of the operations of 1315 may be performed by a measurement component 630 as described with reference to FIG. 6.

At 1320, the method may include incrementing a BFI count according to the BFI counting scheme and based on measuring the reference signal. The operations of 1320 may be performed in accordance with examples as disclosed herein. In some examples, aspects of the operations of 1320 may be performed by a BFI counting component 635 as described with reference to FIG. 6.

At 1325, the method may include selectively transmitting, to the base station, an indication of a BFD based on the BFI count. The operations of 1325 may be performed in accordance with examples as disclosed herein. In some examples, aspects of the operations of 1325 may be performed by an BFD component 640 as described with reference to FIG. 6.

Figure 14:
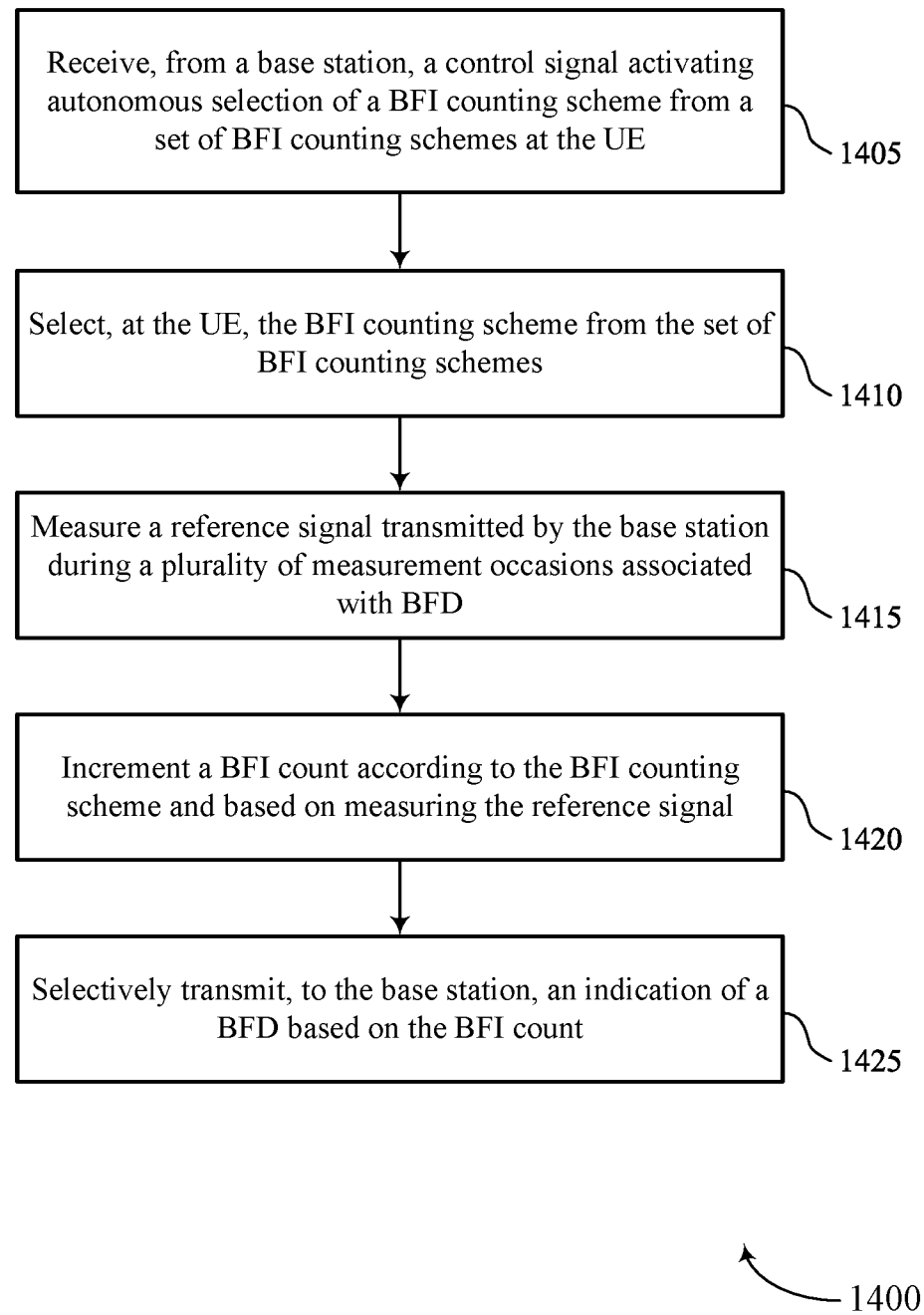

FIG. 14 shows a flowchart illustrating a method 1400 that supports techniques for autonomous BFI counting in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control signal activating autonomous selection of a BFI counting scheme from a set of BFI counting schemes at the UE. The operations of 1405 may be performed in accordance with examples as disclosed herein. In some examples, aspects of the operations of 1405 may be performed by an autonomous selection component 650 as described with reference to FIG. 6.

At 1410, the method may include selecting, at the UE, the BFI counting scheme from the set of BFI counting schemes. The operations of 1410 may be performed in accordance with examples as disclosed herein. In some examples, aspects of the operations of 1410 may be performed by a BFI counting scheme component 625 as described with reference to FIG. 6.

At 1415, the method may include measuring a reference signal transmitted by the base station during a set of multiple measurement occasions associated with BFD. The operations of 1415 may be performed in accordance with examples as disclosed herein. In some examples, aspects of the operations of 1415 may be performed by a measurement component 630 as described with reference to FIG. 6.

At 1420, the method may include incrementing a BFI count according to the BFI counting scheme and based on measuring the reference signal. The operations of 1420 may be performed in accordance with examples as disclosed herein. In some examples, aspects of the operations of 1420 may be performed by a BFI counting component 635 as described with reference to FIG. 6.

At 1425, the method may include selectively transmitting, to the base station, an indication of a BFD based on the BFI count. The operations of 1425 may be performed in accordance with examples as disclosed herein. In some examples, aspects of the operations of 1425 may be performed by an BFD component 640 as described with reference to FIG. 6.

Figure 15:
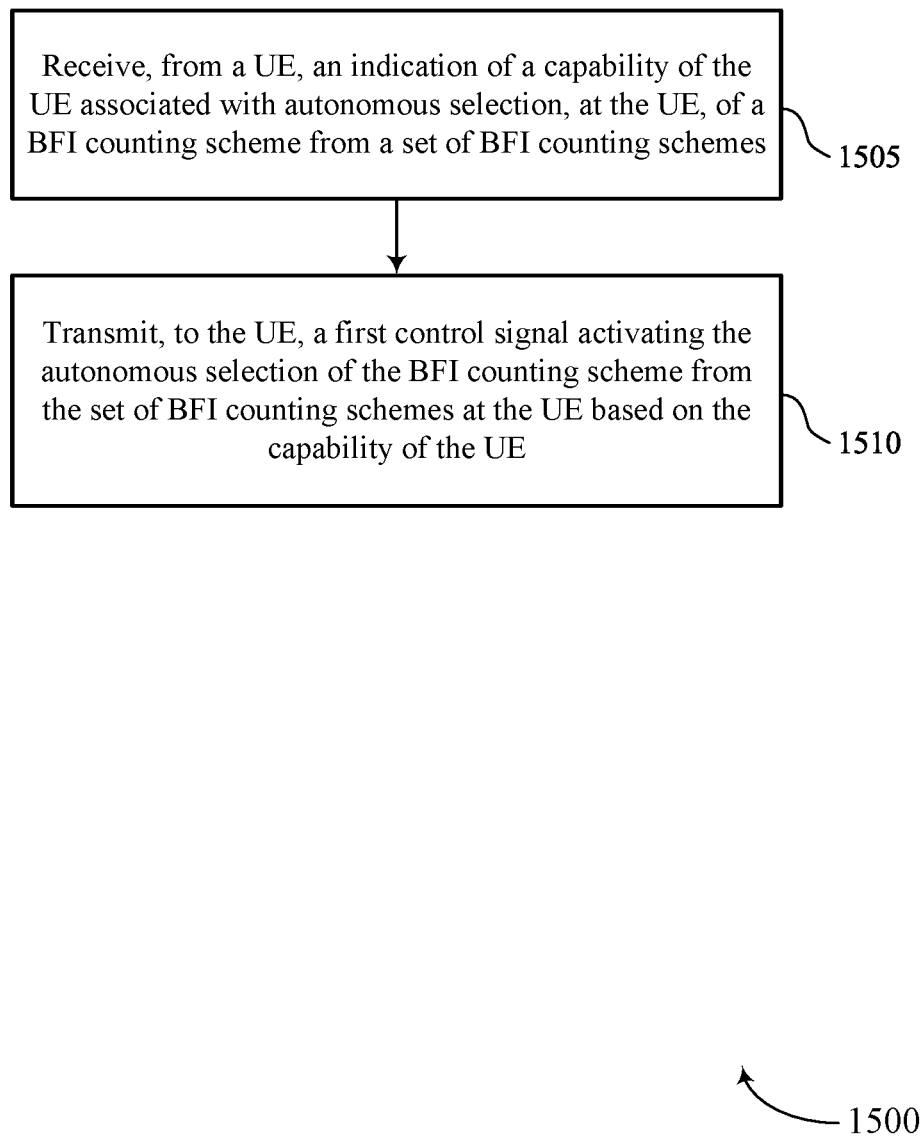

FIG. 15 shows a flowchart illustrating a method 1500 that supports techniques for autonomous BFI counting in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, an indication of a capability of the UE associated with autonomous selection, at the UE, of a BFI counting scheme from a set of BFI counting schemes. The operations of 1505 may be performed in accordance with examples as disclosed herein. In some examples, aspects of the operations of 1505 may be performed by a capability component 1025 as described with reference to FIG. 10.

At 1510, the method may include transmitting, to the UE, a first control signal activating the autonomous selection of the BFI counting scheme from the set of BFI counting schemes at the UE based on the capability of the UE. The operations of 1510 may be performed in accordance with examples as disclosed herein. In some examples, aspects of the operations of 1510 may be performed by an autonomous selection component 1030 as described with reference to FIG. 10.

The following provides an overview of aspects of the present disclosure:

Aspect 1: A method for wireless communication at a UE, comprising: selecting, at the UE, a BFI counting scheme from a set of BFI counting schemes: measuring a reference signal transmitted by a base station during a plurality of measurement occasions associated with BFD: incrementing a BFI count according to the BFI counting scheme and based at least in part on measuring the reference signal: and selectively transmitting, to the base station, an indication of a BFD based at least in part on the BFI count.

Aspect 2: The method of aspect 1, further comprising: transmitting, to the base station, an indication of a capability of the UE associated with autonomous selection of the BFI counting scheme from the set of BFI counting schemes at the UE, wherein selecting the BFI counting scheme from the set of BFI counting schemes is based at least in part on the capability of the UE associated with the autonomous selection of the BFI counting scheme at the UE.

Aspect 3: The method of any of aspects 1 or 2, further comprising: receiving, from the base station, a control signal activating autonomous selection of the BFI counting scheme from the set of BFI counting schemes at the UE, wherein selecting the BFI counting scheme from the set of BFI counting schemes is based at least in part on receiving the control signal activating the autonomous selection of the BFI counting scheme at the UE.

Aspect 4: The method of any of aspects 1 through 3, further comprising: receiving, from the base station, a control signal deactivating autonomous selection of the BFI counting scheme from the set of BFI counting schemes at the UE; and receiving, from the base station, a configuration associated with a single BFI counting scheme.

Aspect 5: The method of any of aspects 1 through 4, further comprising: receiving, from the base station, a control signal indicating an autonomy level of the UE, wherein the autonomy level is associated with one or more of a quantity of the set of BFI counting schemes or available schemes within the set of BFI counting schemes, and wherein selecting the BFI counting scheme from the set of BFI counting schemes is based at least in part on the autonomy level of the UE.

Aspect 6: The method of any of aspects 1 through 5, further comprising: transmitting, to the base station, a request for activation or deactivation of autonomous selection of the BFI counting scheme from the set of BFI counting schemes at the UE: and receiving, from the base station, a control signaling activating or deactivating the autonomous selection of the BFI counting scheme at the UE in accordance with the request for the activation or the deactivation of the autonomous selection of the BFI counting scheme at the UE.

Aspect 7: The method of any of aspects 1 through 6, further comprising: receiving, from the base station, an indication of the set of BFI counting schemes, wherein selecting the BFI counting scheme from the set of BFI counting schemes is based at least in part on receiving the indication of the set of BFI counting schemes.

Aspect 8: The method of any of aspects 1 through 7, wherein the set of BFI counting schemes are pre-configured at the UE.

Aspect 9: The method of any of aspects 1 through 8, further comprising: indicating, from a lower layer of the UE to an upper layer of the UE and based at least in part on the measuring, a BFI report for each measurement occasion of the plurality of measurement occasions associated with BFD during which the UE measures that an error rate associated with the reference signal is greater than a threshold error rate.

Aspect 10: The method of aspect 9, wherein incrementing the BFI count according to the BFI counting scheme and based at least in part on measuring the reference signal comprises: incrementing the BFI count by a first number for each second number of consecutive BFI reports, wherein the first number is less than the second number.

Aspect 11: The method of aspect 9, wherein incrementing the BFI count according to the BFI counting scheme and based at least in part on measuring the reference signal comprises: incrementing the BFI count by a first number for each second number of consecutive BFI reports of a set of consecutive BFI reports if the set of consecutive BFI reports includes less than a threshold quantity of consecutive BFI reports: and incrementing the BFI count by a third number for each fourth number of consecutive BFI reports of the set of consecutive BFI reports if the set of consecutive BFI reports includes greater than the threshold quantity of consecutive BFI reports.

Aspect 12: The method of aspect 11, wherein incrementing the BFI count according to the BFI counting scheme and based at least in part on measuring the reference signal comprises: incrementing a second BFI count by one for each of a total number of BFI reports.

Aspect 13: The method of aspect 9, wherein incrementing the BFI count according to the BFI counting scheme and based at least in part on measuring the reference signal comprises: determining the BFI count in accordance with an output of a machine learning algorithm based at least in part on a number of BFI reports and one or more channel measurements.

Aspect 14: The method of aspect 13, further comprising: receiving, from the base station, feedback associated with the determining of the BFI count in accordance with the output of the machine learning algorithm: and adjusting one or more parameters associated with the machine learning algorithm based at least in part on the feedback.

Aspect 15: The method of any of aspects 1 through 14, wherein selectively transmitting the indication of the BFD comprises: transmitting the indication of the BFD if the BFI count exceeds a threshold count prior to expiration of a timer.

Aspect 16: The method of any of aspects 1 through 14, wherein selectively transmitting the indication of the BFD comprises: refraining from transmitting the indication of the BFD if the BFI count is less than a threshold count at expiration of a timer.

Aspect 17: The method of any of aspects 1 through 16, wherein the reference signal comprises a periodic reference signal and the plurality of measurement occasions associated with BFD are based at least in part on a periodicity associated with the periodic reference signal.

Aspect 18: A method for wireless communication at a base station, comprising: receiving, from a UE, an indication of a capability of the UE associated with autonomous selection, at the UE, of a BFI counting scheme from a set of BFI counting schemes: and transmitting, to the UE, a first control signal activating the autonomous selection of the BFI counting scheme from the set of BFI counting schemes at the UE based at least in part on the capability of the UE.

Aspect 19: The method of aspect 18, further comprising: transmitting, to the UE, a second control signal indicating an autonomy level of the UE for the autonomous selection of the BFI counting scheme at the UE, wherein the autonomy level is associated with one or more of a quantity of the set of BFI counting schemes or available schemes within the set of BFI counting schemes.

Aspect 20: The method of any of aspects 18 or 19, further comprising: receiving, from the UE, a request for activation of the autonomous selection of the BFI counting scheme at the UE, wherein transmitting the first control signal activating the autonomous selection of the BFI counting scheme at the UE is based at least in part on receiving the request.

Aspect 21: The method of any of aspects 18 through 20, further comprising: transmitting, to the UE, a second control signal deactivating the autonomous selection of the BFI counting scheme at the UE: and transmitting, to the UE, a configuration associated with a single BFI counting scheme.

Aspect 22: The method of aspect 21, further comprising: receiving, from the UE, a request for deactivation of the autonomous selection of the BFI counting scheme at the UE, wherein transmitting the second control signal deactivating the autonomous selection of the BFI counting scheme at the UE is based at least in part on receiving the request.

Aspect 23: The method of any of aspects 18 through 22, further comprising: transmitting, to the UE, an indication of the set of BFI counting schemes, wherein transmitting the first control signal activating the autonomous selection of the BFI counting scheme from the set of BFI counting schemes at the UE is based at least in part on transmitting the indication of the set of BFI counting schemes.

Aspect 24: The method of any of aspects 18 through 23, further comprising: receiving, from the UE, an indication of a BFD based at least in part on activating the autonomous selection of the BFI counting scheme at the UE.

Aspect 25: An apparatus for wireless communication at a UE, comprising a processor: memory coupled with the processor: and instructions stored in the memory and executable by the processor to cause the apparatus to perform a method of any of aspects 1 through 17.

Aspect 26: An apparatus for wireless communication at a UE, comprising at least one means for performing a method of any of aspects 1 through 17.

Aspect 27: A non-transitory computer-readable medium storing code for wireless communication at a UE, the code comprising instructions executable by a processor to perform a method of any of aspects 1 through 17.

Aspect 28: An apparatus for wireless communication at a base station, comprising a processor: memory coupled with the processor: and instructions stored in the memory and executable by the processor to cause the apparatus to perform a method of any of aspects 18 through 24.

Aspect 29: An apparatus for wireless communication at a base station, comprising at least one means for performing a method of any of aspects 18 through 24.

Aspect 30: A non-transitory computer-readable medium storing code for wireless communication at a base station, the code comprising instructions executable by a processor to perform a method of any of aspects 18 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    selecting, autonomously at the UE, a beam failure indicator counting scheme from a set of beam failure indicator counting schemes;
    measuring a reference signal transmitted by a network device during a plurality of measurement occasions associated with beam failure detection;
    incrementing a beam failure indicator count according to the beam failure indicator counting scheme and based at least in part on measuring the reference signal; and
    selectively transmitting, to the network device, an indication of a beam failure detection based at least in part on the beam failure indicator count.

2. The method of claim 1, further comprising:
    transmitting, to the network device, an indication of a capability of the UE associated with autonomous selection of the beam failure indicator counting scheme from the set of beam failure indicator counting schemes at the UE, wherein selecting the beam failure indicator counting scheme from the set of beam failure indicator counting schemes is based at least in part on the capability of the UE associated with the autonomous selection of the beam failure indicator counting scheme at the UE.

3. The method of claim 1, further comprising:
    receiving, from the network device, a control signal activating autonomous selection of the beam failure indicator counting scheme from the set of beam failure indicator counting schemes at the UE, wherein selecting the beam failure indicator counting scheme from the set of beam failure indicator counting schemes is based at least in part on receiving the control signal activating the autonomous selection of the beam failure indicator counting scheme at the UE.

4. The method of claim 1, further comprising:
    receiving, from the network device, a control signal deactivating autonomous selection of the beam failure indicator counting scheme from the set of beam failure indicator counting schemes at the UE; and
    receiving, from the network device, a configuration associated with a single beam failure indicator counting scheme.

5. The method of claim 1, further comprising:
    receiving, from the network device, a control signal indicating an autonomy level of the UE, wherein the autonomy level is associated with one or more of a quantity of the set of beam failure indicator counting schemes or available schemes within the set of beam failure indicator counting schemes, and wherein selecting the beam failure indicator counting scheme from the set of beam failure indicator counting schemes is based at least in part on the autonomy level of the UE.

6. The method of claim 1, further comprising:
    transmitting, to the network device, a request for activation or deactivation of autonomous selection of the beam failure indicator counting scheme from the set of beam failure indicator counting schemes at the UE; and
    receiving, from the network device, a control signaling activating or deactivating the autonomous selection of the beam failure indicator counting scheme at the UE in accordance with the request for the activation or the deactivation of the autonomous selection of the beam failure indicator counting scheme at the UE.

7. The method of claim 1, further comprising:
receiving, from the network device, an indication of the set of beam failure indicator counting schemes, wherein selecting the beam failure indicator counting scheme from the set of beam failure indicator counting schemes is based at least in part on receiving the indication of the set of beam failure indicator counting schemes.

8. The method of claim 1, wherein the set of beam failure indicator counting schemes are pre-configured at the UE.

9. The method of claim 1, further comprising:
indicating, from a lower layer of the UE to an upper layer of the UE and based at least in part on the measuring, a beam failure indicator report for each measurement occasion of the plurality of measurement occasions associated with beam failure detection during which the UE measures that an error rate associated with the reference signal is greater than a threshold error rate.

10. The method of claim 9, wherein incrementing the beam failure indicator count according to the beam failure indicator counting scheme and based at least in part on measuring the reference signal comprises:
incrementing the beam failure indicator count by a first number for each second number of consecutive beam failure indicator reports, wherein the first number is less than the second number.

11. The method of claim 9, wherein incrementing the beam failure indicator count according to the beam failure indicator counting scheme and based at least in part on measuring the reference signal comprises:
incrementing the beam failure indicator count by a first number for each second number of consecutive beam failure indicator reports of a set of consecutive beam failure indicator reports if the set of consecutive beam failure indicator reports includes less than a threshold quantity of consecutive beam failure indicator reports; and
incrementing the beam failure indicator count by a third number for each fourth number of consecutive beam failure indicator reports of the set of consecutive beam failure indicator reports if the set of consecutive beam failure indicator reports includes greater than the threshold quantity of consecutive beam failure indicator reports.

12. The method of claim 11, wherein incrementing the beam failure indicator count according to the beam failure indicator counting scheme and based at least in part on measuring the reference signal comprises:
incrementing a second beam failure indicator count by one for each of a total number of beam failure indicator reports.

13. The method of claim 9, wherein incrementing the beam failure indicator count according to the beam failure indicator counting scheme and based at least in part on measuring the reference signal comprises:
determining the beam failure indicator count in accordance with an output of a machine learning algorithm based at least in part on a number of beam failure indicator reports and one or more channel measurements.

14. The method of claim 13, further comprising:
receiving, from the network device, feedback associated with the determining of the beam failure indicator count in accordance with the output of the machine learning algorithm; and
adjusting one or more parameters associated with the machine learning algorithm based at least in part on the feedback.

15. The method of claim 1, wherein selectively transmitting the indication of the beam failure detection comprises:
transmitting the indication of the beam failure detection if the beam failure indicator count exceeds a threshold count prior to expiration of a timer.

16. The method of claim 1, wherein selectively transmitting the indication of the beam failure detection comprises:
refraining from transmitting the indication of the beam failure detection if the beam failure indicator count is less than a threshold count at expiration of a timer.

17. The method of claim 1, wherein the reference signal comprises a periodic reference signal and the plurality of measurement occasions associated with beam failure detection are based at least in part on a periodicity associated with the periodic reference signal.

18. A method for wireless communication at a network device, comprising:
receiving, from a user equipment (UE), an indication of a capability of the UE associated with autonomous selection, at the UE, of a beam failure indicator counting scheme from a set of beam failure indicator counting schemes; and
transmitting, to the UE, a first control signal activating the autonomous selection of the beam failure indicator counting scheme from the set of beam failure indicator counting schemes at the UE based at least in part on the capability of the UE.

19. The method of claim 18, further comprising:
transmitting, to the UE, a second control signal indicating an autonomy level of the UE for the autonomous selection of the beam failure indicator counting scheme at the UE, wherein the autonomy level is associated with one or more of a quantity of the set of beam failure indicator counting schemes or available schemes within the set of beam failure indicator counting schemes.

20. The method of claim 18, further comprising:
receiving, from the UE, a request for activation of the autonomous selection of the beam failure indicator counting scheme at the UE, wherein transmitting the first control signal activating the autonomous selection of the beam failure indicator counting scheme at the UE is based at least in part on receiving the request.

21. The method of claim 18, further comprising:
transmitting, to the UE, a second control signal deactivating the autonomous selection of the beam failure indicator counting scheme at the UE; and
transmitting, to the UE, a configuration associated with a single beam failure indicator counting scheme.

22. The method of claim 21, further comprising:
receiving, from the UE, a request for deactivation of the autonomous selection of the beam failure indicator counting scheme at the UE, wherein transmitting the second control signal deactivating the autonomous selection of the beam failure indicator counting scheme at the UE is based at least in part on receiving the request.

23. The method of claim 18, further comprising:
transmitting, to the UE, an indication of the set of beam failure indicator counting schemes, wherein transmitting the first control signal activating the autonomous selection of the beam failure indicator counting scheme from the set of beam failure indicator counting schemes at the UE is based at least in part on transmitting the indication of the set of beam failure indicator counting schemes.

24. The method of claim 18, further comprising:
receiving, from the UE, an indication of a beam failure detection based at least in part on activating the autonomous selection of the beam failure indicator counting scheme at the UE.

25. An apparatus for wireless communication at a user equipment (UE), comprising:
at least one processor;
at least one memory coupled with the at least one processor; and
instructions stored in the at least one memory and executable by the at least one processor to cause the apparatus to:
select, autonomously at the UE, a beam failure indicator counting scheme from a set of beam failure indicator counting schemes;
measure a reference signal transmitted by a network device during a plurality of measurement occasions associated with beam failure detection;
increment a beam failure indicator count according to the beam failure indicator counting scheme and based at least in part on measuring the reference signal; and
selectively transmit, to the network device, an indication of a beam failure detection based at least in part on the beam failure indicator count.

26. The apparatus of claim 25, wherein the instructions are further executable by the at least one processor to cause the apparatus to:
transmit, to the network device, an indication of a capability of the UE associated with autonomous selection of the beam failure indicator counting scheme from the set of beam failure indicator counting schemes at the UE, wherein selecting the beam failure indicator counting scheme from the set of beam failure indicator counting schemes is based at least in part on the capability of the UE associated with the autonomous selection of the beam failure indicator counting scheme at the UE.

27. The apparatus of claim 25, wherein the instructions are further executable by the at least one processor to cause the apparatus to:
receive, from the network device, a control signal activating autonomous selection of the beam failure indicator counting scheme from the set of beam failure indicator counting schemes at the UE, wherein selecting the beam failure indicator counting scheme from the set of beam failure indicator counting schemes is based at least in part on receiving the control signal activating the autonomous selection of the beam failure indicator counting scheme at the UE.

28. An apparatus for wireless communication at a network device, comprising:
at least one processor;
at least one memory coupled with the at least one processor; and
instructions stored in the at least one memory and executable by the at least one processor to cause the apparatus to:
receive, from a user equipment (UE), an indication of a capability of the UE associated with autonomous selection, at the UE, of a beam failure indicator counting scheme from a set of beam failure indicator counting schemes; and
transmit, to the UE, a first control signal activating the autonomous selection of the beam failure indicator counting scheme from the set of beam failure indicator counting schemes at the UE based at least in part on the capability of the UE.

29. The apparatus of claim 28, wherein the instructions are further executable by the at least one processor to cause the apparatus to:
transmit, to the UE, a second control signal indicating an autonomy level of the UE for the autonomous selection of the beam failure indicator counting scheme at the UE, wherein the autonomy level is associated with one or more of a quantity of the set of beam failure indicator counting schemes or available schemes within the set of beam failure indicator counting schemes.

30. The apparatus of claim 28, wherein the instructions are further executable by the at least one processor to cause the apparatus to:
receive, from the UE, a request for activation of the autonomous selection of the beam failure indicator counting scheme at the UE, wherein transmitting the first control signal activating the autonomous selection of the beam failure indicator counting scheme at the UE is based at least in part on receiving the request.

* * * * *